US008874555B1

(12) United States Patent
Kim et al.

(10) Patent No.: US 8,874,555 B1
(45) Date of Patent: Oct. 28, 2014

(54) MODIFYING SCORING DATA BASED ON HISTORICAL CHANGES

(75) Inventors: Hyung-Jin Kim, Sunnyvale, CA (US); Andrei Lopatenko, Cupertino, CA (US)

(73) Assignee: Google Inc., Mountain View, CA (US)

( * ) Notice: Subject to any disclaimer, the term of this patent is extended or adjusted under 35 U.S.C. 154(b) by 602 days.

(21) Appl. No.: 12/623,276

(22) Filed: Nov. 20, 2009

(51) Int. Cl.
*G06F 17/30* (2006.01)
*G06F 7/00* (2006.01)

(52) U.S. Cl.
USPC .......................................... 707/723; 707/803

(58) Field of Classification Search
USPC .................................................. 707/723, 803
See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 5,963,940 A | 10/1999 | Liddy et al. | |
| 6,006,222 A | 12/1999 | Culliss | |
| 6,026,388 A | 2/2000 | Liddy et al. | |
| 6,078,917 A | 6/2000 | Paulsen et al. | |
| 6,088,692 A | 7/2000 | Driscoll | |
| 6,182,066 B1 | 1/2001 | Marques et al. | |
| 6,185,559 B1 | 2/2001 | Brin et al. | |
| 6,249,252 B1 | 6/2001 | Dupray | |
| 6,285,999 B1 | 9/2001 | Page | |
| 6,321,228 B1 | 11/2001 | Crandall et al. | |
| 6,327,590 B1 | 12/2001 | Chidlovskii et al. | |
| 6,353,849 B1 | 3/2002 | Linsk | |
| 6,363,378 B1 | 3/2002 | Conklin et al. | |
| 6,370,526 B1 | 4/2002 | Agrawal et al. | |
| 6,421,675 B1 | 7/2002 | Ryan et al. | |
| 6,480,843 B2 | 11/2002 | Li | |
| 6,490,575 B1 | 12/2002 | Berstis | |
| 6,526,440 B1 | 2/2003 | Bharat | |
| 6,529,903 B2 | 3/2003 | Smith et al. | |
| 6,560,590 B1 | 5/2003 | Shwe et al. | |

(Continued)

FOREIGN PATENT DOCUMENTS

| | | |
|---|---|---|
| WO | WO 00/77689 | 12/2000 |
| WO | WO 01/16807 | 3/2001 |
| WO | WO 01/67297 | 9/2001 |
| WO | WO 2004/059514 | 7/2004 |

OTHER PUBLICATIONS

McDonnell, Philip, A., 'Time Based Ranking,' U.S. Appl. No. 11/870,893, filed Oct. 11, 2007, 42 pages.

(Continued)

*Primary Examiner* — Kuen Lu
(74) *Attorney, Agent, or Firm* — Fish & Richardson P.C.

(57) ABSTRACT

Methods, systems, and apparatus, including computer programs encoded on computer storage media, for modifying historical data. One method includes calculating time trend statistics for a document and a query during different time periods. The method further includes modifying a quality of result statistic for the document as a search result for the query by a factor based on the one or more time trend statistics. The method further includes providing the modified quality of result statistic as an input to a document ranking process. Another method includes calculating a difference score for statistics for a group of documents and a query for a first time period and a second time period. The method further includes modifying quality of result statistics for documents responsive to the query based on the difference score. The method further includes providing the modified statistics as an input to a document ranking process.

51 Claims, 11 Drawing Sheets

(56) References Cited

U.S. PATENT DOCUMENTS

| | | |
|---|---|---|
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,853,993 B2 | 2/2005 | Ortega et al. |
| 6,877,002 B2 | 4/2005 | Prince |
| 6,882,999 B2 | 4/2005 | Cohen et al. |
| 6,944,611 B2 | 9/2005 | Flank et al. |
| 6,944,612 B2 | 9/2005 | Roustant et al. |
| 6,954,750 B2 | 10/2005 | Bradford |
| 6,963,867 B2 | 11/2005 | Ford et al. |
| 6,990,453 B2 | 1/2006 | Wang et al. |
| 7,028,027 B1 | 4/2006 | Zha et al. |
| 7,085,761 B2 | 8/2006 | Shibata |
| 7,113,939 B2 | 9/2006 | Chou et al. |
| 7,117,206 B1 | 10/2006 | Bharat et al. |
| 7,146,361 B2 | 12/2006 | Broder et al. |
| 7,222,127 B1 | 5/2007 | Bem et al. |
| 7,231,399 B1 | 6/2007 | Bem et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,516,146 B2 | 4/2009 | Robertson et al. |
| 7,526,470 B1 | 4/2009 | Karnawat et al. |
| 7,533,130 B2 | 5/2009 | Narayana et al. |
| 7,565,367 B2 | 7/2009 | Barrett et al. |
| 7,574,530 B2 | 8/2009 | Wang et al. |
| 7,584,181 B2 | 9/2009 | Zeng et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,818,315 B2 | 10/2010 | Cucerzan et al. |
| 7,818,320 B2 | 10/2010 | Makeev |
| 7,877,404 B2 | 1/2011 | Achan et al. |
| 7,895,177 B2 | 2/2011 | Wu |
| 7,953,740 B1 | 5/2011 | Vadon et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,027,439 B2 | 9/2011 | Zoldi et al. |
| 8,051,061 B2 | 11/2011 | Niu et al. |
| 8,060,456 B2 | 11/2011 | Gao et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2* | 12/2011 | Bishop et al. .................. 705/39 |
| 8,086,599 B1 | 12/2011 | Heymans |
| 8,090,717 B1 | 1/2012 | Bharat et al. |
| 8,156,111 B2 | 4/2012 | Jones et al. |
| 8,224,827 B2 | 7/2012 | Dean et al. |
| 8,412,699 B1 | 4/2013 | Mukherjee et al. |
| 8,458,165 B2 | 6/2013 | Liao et al. |
| 8,498,974 B1 | 7/2013 | Kim et al. |
| 8,521,725 B1 | 8/2013 | Pearson et al. |
| 8,583,636 B1 | 11/2013 | Franz et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1* | 1/2003 | Boerner .................. 705/35 |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |
| 2004/0006740 A1 | 1/2004 | Krohn et al. |
| 2004/0049486 A1 | 3/2004 | Scanlon et al. |
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0199419 A1 | 10/2004 | Kim et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0125376 A1 | 6/2005 | Curtis et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0256848 A1 | 11/2005 | Alpert et al. |
| 2006/0047643 A1 | 3/2006 | Chaman |
| 2006/0074903 A1 | 4/2006 | Meyerzon et al. |
| 2006/0089926 A1 | 4/2006 | Knepper et al. |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0227992 A1 | 10/2006 | Rathus et al. |
| 2006/0230040 A1 | 10/2006 | Curtis et al. |
| 2006/0293950 A1 | 12/2006 | Meek et al. |
| 2007/0005588 A1 | 1/2007 | Zhang et al. |
| 2007/0050339 A1 | 3/2007 | Kasperski et al. |
| 2007/0061195 A1 | 3/2007 | Liu et al. |
| 2007/0106659 A1 | 5/2007 | Lu et al. |
| 2007/0130370 A1 | 6/2007 | Akaezuwa |
| 2007/0172155 A1 | 7/2007 | Guckenberger |
| 2007/0180355 A1 | 8/2007 | McCall et al. |
| 2007/0208730 A1 | 9/2007 | Agichtein et al. |
| 2007/0233653 A1 | 10/2007 | Biggs et al. |
| 2007/0255689 A1 | 11/2007 | Sun et al. |
| 2007/0260596 A1 | 11/2007 | Koran et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0077570 A1 | 3/2008 | Tang et al. |
| 2008/0082518 A1 | 4/2008 | Loftesness |
| 2008/0104043 A1 | 5/2008 | Garg et al. |
| 2008/0114750 A1 | 5/2008 | Saxena et al. |
| 2008/0140699 A1 | 6/2008 | Jones et al. |
| 2008/0189269 A1 | 8/2008 | Olsen |
| 2008/0228442 A1* | 9/2008 | Lippincott et al. ............ 702/179 |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0055392 A1 | 2/2009 | Gupta et al. |
| 2009/0070194 A1 | 3/2009 | Song |
| 2009/0157643 A1 | 6/2009 | Gollapudi et al. |
| 2009/0182723 A1 | 7/2009 | Shnitko et al. |
| 2009/0228442 A1 | 9/2009 | Adams et al. |
| 2009/0287656 A1* | 11/2009 | Bennett .................. 707/3 |
| 2010/0106706 A1 | 4/2010 | Rorex et al. |
| 2010/0131563 A1 | 5/2010 | Yin |
| 2010/0228738 A1 | 9/2010 | Mehta et al. |
| 2011/0064795 A1 | 3/2011 | Tosi et al. |

(56) References Cited

U.S. PATENT DOCUMENTS

| | | |
|---|---|---|
| 2011/0064796 A1 | 3/2011 | Tosi et al. |
| 2011/0219025 A1 | 9/2011 | Lipson et al. |
| 2011/0282906 A1 | 11/2011 | Wong |
| 2011/0295879 A1 | 12/2011 | Logis et al. |
| 2012/0011148 A1 | 1/2012 | Rathus et al. |
| 2012/0191705 A1 | 7/2012 | Tong et al. |

OTHER PUBLICATIONS

Agichtein, et al., *Improving Web Search Ranking by Incorporating User Behavior Information*, Aug. 6-11, 2006, Proceedings of the Twenty-Ninth Annual International ACM SIGIR Conference on Research and Development in Information Retrieval, pp. 19-26.

Agichtein, et al., *Learning User Interaction Models for Predicting Web Search Result Performances*; Aug. 6-11, 2006, Proceedings of the Twenty-Ninth Annual International ACM SIGIR Conference on Research and Development in Information Retrieval, pp. 3-10.

Boyan et al., *A Machine Learning Architecture for Optimizing Web Search Engines*, Aug. 1996, Internet-Based Information Systems-Workshop Technical Report-American Association for Artificial Intelligence, pp. 1-8.

Cutrell, et al., *Eye Tracking in MSN Search: Investigating Snippet Length, Target Position and Task Types*, 2007, Conference on Human Factors in Computing Systems—Proceedings of the SIGCHI Conference on Human Factors in Computing Systems, pp. 1-13.

Joachims, *Optimizing Search Engines Using Clickthrough Data*, 2002, Proceedings of the ACM SIGKDD International Conference on Knowledge Discovery and Data Mining, 10 pages.

Kelly, et al., *Implicit Feedback for Inferring User Preference: A Bibliography*, SIGIR Forum, vol. 37, No. 2 (2003), 11 pages.

Grčar, Miha, *User Profiling: Collaborative Filtering*, SIKDD 2004, Oct. 12-15, 2004, Ljubljana, Slovenia, 4 pages.

Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.

U.S. Patent Office, U.S. Appl. No. 11/556,143, filed Nov. 2, 2006, in Office Action mailed Jan. 25, 2010, 14 pages.

U.S. Patent Office, U.S. Appl. No. 11/556,143, filed Nov. 2, 2006, in Office Action mailed Jul. 6, 2010, 20 pages.

U.S. Patent Office, U.S. Appl. No. 11/556,143, filed Nov. 2, 2006, in Office Action mailed Apr. 20, 2011, 18 pages.

U.S. Patent Office, U.S. Appl. No. 11/685,095, filed Mar. 12, 2007, in Office Action mailed Feb. 8, 2010, 31 pages.

U.S. Patent Office, U.S. Appl. No. 11/685,095, filed Mar. 12, 2007, in Office Action mailed Feb. 25, 2009, 21 pages.

U.S. Patent Office, U.S. Appl. No. 11/685,095, filed Mar. 12, 2007, in Office Action mailed Sep. 10, 2009, 23 pages.

U.S. Patent Office, U.S. Appl. No. 11/685,095, filed Mar. 12, 2007, in Office Action mailed Apr. 13, 2011, 31 pages.

U.S. Patent Office, U.S. Appl. No. 11/556,086, filed Nov. 2, 2006, in Office Action mailed Jun. 23, 2010, 21 pages.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; "Methods for comparing rankings of search engine results"; Computer Networks: The International Journal of Computer and Telecommunications Networking, Jul. 2006, vol. 50, Issue 10 , 19 pages.

Boldi, et al.; *The Query flow Graph: Model and Applications; CKIM '08*, Oct. 26-30, Napa Valley, California, USA, pp. 609-617.

Burke, Robin, Integrating Knowledge-based and Collaborative-filtering Recommender Systems, AAAI Technical Report WS-99-01. Compilation copyright © 1999, AAAI (www.aaai.org), pp. 69-72.

Craswell, et al.; *Random Walks on the Click Graph*; Jul. 2007; SIGIR '07, Amsterdam, the Netherlands, 8 pages.

Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.

Hofmann, Thomas, *Latent Semantic Models for Collaborative Filtering*, ACM Transactions on Information Systems, vol. 22, No. 1, Jan. 2004, pp. 89-115.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Grčar, Miha, *User Profiling: Collaborative Filtering*, SIKDD 2004, Oct. 12-15, 2004, Ljubljana, Slovenia, 4 pages.

Joachims, T., Evaluating retrieval performance using clickthrough data. Proceedings of the SIGIR Workshop on Mathematical/Formal Methods in Information Retrieval; 2002, Aug. 12-15; Tampere, Finland, 18 pages.

Joachims et al., "Search Engines that Learn from Implicit Feedback"; Aug. 2007, IEEE Computer Society.

Linden, Greg et al., *Amazon.com Recommendations: Item-to-Item Collaborative Filtering*, [online], http://computer.org/internet/, IEEE Internet Computing, Jan.-Feb. 2003, IEEE Computer Society, pp. 76-80.

U.S. Appl. No. 11/556,143, filed Nov. 2, 2006, in Office Action mailed Jan. 25, 2010, 14 pages.

U.S. Appl. No. 11/556,143, filed Nov. 2, 2006, in Office Action mailed Jul. 6, 2010, 20 pages.

U.S. Appl. No. 11/556,143, filed Nov. 2, 2006, in Office Action mailed Apr. 20, 2011, 18 pages.

Nicole, Kristen, *Heeii is StumbleUpon Plus Google Suggestions*, [online], Retrieved from the Internet http://mashable.com/2007/05/15/heeii/, 11 pages.

Lemire, Daniel, *Scale and Translation Invariant Collaborative Filtering Systems*, Published in Information Retrieval, 8(1), pp. 129-150, 2005.

U.S. Appl. No. 11/685,095, filed Mar. 12, 2007, in Office Action mailed Feb. 8, 2010, 31 pages.

U.S. Appl. No. 11/685,095, filed Mar. 12, 2007, in Office Action mailed Feb. 25, 2009, 21 pages.

U.S. Appl. No. 11/685,095, filed Mar. 12, 2007, in Office Action mailed Sep. 10, 2009, 23 pages.

U.S. Appl. No. 11/685,095, filed Mar. 12, 2007, in Office Action mailed Apr. 13, 2011, 31 pages.

Radlinski, et al., *Query Chains: Learning to Rank from Implicit Feedback*, KDD '05, Aug. 21-24, 2005, Chicago, Illinois, USA, 10 pages.

U.S. Appl. No. 11/556,086, filed Nov. 2, 2006, in Office Action mailed Jun. 23, 2010, 21 pages.

Schwab, et al., *Adaptivity through Unobstrusive Learning*, 2002, 16(3), pp. 5-9.

Stoilova, Lubomira et al., *GiveALink: Mining a Semantic Network of Bookmarks for Web Search and Recommendation*, LinkKDD '05, Aug. 21, 2005, Chicago, IL, USA, 8 pages.

W3C, URIs, URLs and URNs: Classification and Recommendations 1.0, Report from the joint W3C/IETF URI Planning Interest Group, Sep. 21, 2001, 8 pages.

Xiao, et al., *Measuring Similarity of Interests for Clustering Web-Users*, ADC, 2001, pp. 107-114.

Xie et al., *Web User Clustering from Access Log Using Belief Function*, K-CAP '01, Oct. 22-23, 2001, Victoria, British Columbia, Canada, pp. 202-208.

Yu et al., *Selecting Relevant Instances for Efficient and Accurate Collaborative Filtering*, CIKM '01, Nov. 5-10, 2001, Atlanta, Georgia, pp. 239-246.

Zeng et al., *Similarity Measure and Instance Selection for Collaborative Filtering*, WWW '03, May 20-24, 2003, Budapest, Hungary, pp. 652-658.

Zeng, et al., "Learning to Cluster Web Search Results", SIGIR '04, Proceedings of the 27th Annual International ACM SIGIR conference on research and development in information retrieval, 2004.

Soumen Chakrabarti, et al. "Enhanced Topic Distillation using Text, Markup tags, and Hyperlinks" ACM 2001, pp. 208-216.

Gabriel Somlo et al., "Using Web Hepler Agent Profiles in Query Generation", ACM, Jul. 2003, pp. 812-818.

(56) References Cited

OTHER PUBLICATIONS

Australian Examiner, Tim Yang, Australian Patent Office Non-Final Office Action in AU App. Ser. No. 2004275274, mailed Feb. 3, 2010, 2 pages.

Dan Olsen et al., "Query-by-critique: Spoken Language Access to Large Lists", ACM, Oct. 2002, pp. 131-140.

Susan Gauch et al., "A Corpus Analysis Approach for Automatic Query Expansion and its Extension to Multiple Databases", ACM, 1999, pp. 250-269.

Nicolas Bruno et al., "Top-K Selection Queries over Relational Databases: Mapping Strategies and Performance Evaluation", ACM, Jun. 2002, pp. 153-187.

Ji-Rong Wen et al., "Query Clustering using User Logs", ACM, Jan. 2002, pp. 59-81.

Brin, S. And L. Page, The Anatomy of a Large-Scale Hypertextual Web Search Engine, Computer Science Department, 1998.

International Search Report and Written Opinion for Application No. PCT/US2004/029615, dated Jan. 19, 2005, 8 pages.

Hungarian Patent Office, International Search Report and Written Opinion for Application No. 200806756-3, dated Nov. 19, 2010 12 pages.

Authorized Officer Athina Nickitas-Etienne, International Preliminary Report and Written Opinion for Application No. PCT/US2004/029615, mailed Mar. 23, 2006.

Indian Office Action in Indian Application No. 686/KOLNP/2006, mailed Jun. 3, 2008, 2 pages.

Danish Search Report and Written Opinion for Application No. 200601630-7, dated Jun. 21, 2007, 15 pages.

Jones et al., "Pictures of Relevance: A Geometric Analysis of Similarity Measures", Journal of the American Society for Information Science, Nov. 1987, 23 pages.

Kaplan et al., "Adaptive Hypertext Navigation Based on User Goals and Context", User Modeling and User-Adapted Interaction 2, Sep. 1, 1993; pp. 193-220, 28 pages.

Liddy et al., "A Natural Language Text Retrieval System With Relevance Feedback", 16th National Online, May 2-6, 1995, 3 pages.

\* cited by examiner

MODIFYING SCORING DATA BASED ON HISTORICAL CHANGES

BACKGROUND

This specification relates to providing inputs to scoring functions. Internet search engines provide information about Internet accessible resources (e.g., Web pages, images, text documents, multimedia content) that are responsive to a user's search query by returning a set of search results in response to the query. A search result includes, for example, a Uniform Resource Locator (URL) and a snippet of information for resources responsive to a query. The search results can be ranked (e.g., in an order) according to scores assigned to the search results by a scoring function.

The scoring function ranks the search results according to various signals, for example, where (and how often) query terms appear in the search results and how common the query terms are in the search results indexed by the search engine. Some scoring functions alternatively, or additionally, use signals that describe past user behavior, for example, how frequently a user selected a given search result after the search result was presented on a search results page for the query.

SUMMARY

This specification describes technologies relating to providing input to a function that ranks search results responsive to a query.

In general, one aspect of the subject matter described in this specification can be embodied in methods that include the actions of calculating one or more time trend statistics for a plurality of quality of result statistics for a first document as a search result for a first query, each of the quality of result statistics corresponding to a different time period, the one or more time trend statistics estimating changes in the quality of result statistics over time; generating a first modified quality of result statistic by modifying a first quality of result statistic for the first document as a search result for the first query by a factor, where the factor is based on the one or more time trend statistics; and providing the first modified quality of result statistic as an input to a document ranking process for the first document and the first query. Other embodiments of this aspect include corresponding systems, apparatus, and computer programs products recorded on computer storage devices, each configured to perform the operations of the methods.

These and other embodiments can each optionally include one or more of the following features. The one or more time trend statistics can include a quality of result difference between a first quality of result statistic for a first document as a search result for a first query for a first time period and a second quality of result statistic for the first document as a search result the first query for a second time period, where the first quality of result statistic is a quality of result statistic for the first document as a search result for the first query during a first time period, and the second quality of result statistic is a quality of result statistic for the first document as a search result for the first query during a second time period. The method can further include verifying that the quality of result difference satisfies a statistically significant threshold before generating the first modified quality of result statistic. The factor can be further based on how statistically significant the quality of result difference is. The method can further include generating a second modified quality of result statistic for the first document and a second different query according to the one or more time trend statistics; and providing the second modified quality of result statistic as an input to the document ranking process for the first document and the second query.

The method can further include determining that a first past version of the first document during the first time period is different from a second past version of the first document during the second time period before modifying the first quality of result statistic.

Determining that the first past version of the first document is different from the second past version of the first document can include calculating a similarity score that is a measure of similarities between shingles extracted from the first past version of the first document and shingles extracted from the second past version of the first document, and determining that the similarity score satisfies a threshold.

The method can further include identifying a third query as related to the first document based on a quality of result statistic for the third query and the first document; generating a third modified quality of result statistic for the third query and a second document by modifying a quality of result statistic for the third query and the second document by a factor, where the factor is based on the one or more time trend statistics; and providing the third modified quality of result statistic as an input to the document ranking process for the second document and the third query. Each quality of result statistic can be an estimate of a respective percentage of users that found the first document relevant to the first query out of a first total number of users who viewed the first document as a search result for the first query during a respective time period.

In general, another aspect of the subject matter described in this specification can be embodied in methods that include the actions of calculating a difference score for first quality of result statistics for a group of documents as search results for a first query corresponding to a first time period and second quality of result statistics for the group of documents as search results for the first query corresponding to a different second time period; identifying one or more documents that are responsive to the first query and modifying a respective quality of result statistic for each identified document based on the difference score, resulting in a respective modified quality of result statistic for each identified document; and providing the respective modified quality of result statistic for one of the identified documents as an input to the document ranking process for the identified documents and the first query. Other embodiments of this aspect include corresponding systems, apparatus, and computer programs products recorded on computer storage devices, each configured to perform the operations of the methods.

These and other embodiments can each optionally include one or more of the following features. Each first quality of result statistic can measure a percentage of user interactions with a document in the group of documents presented in response to the first query during the first time period out of all user interactions with documents presented in response to the first query during the first time period, and each second quality of result statistic can measure a percentage of user interactions with a document in the group of documents presented in response to the first query during the second time period out of all user interactions with documents presented in response to the first query during the second time period.

Particular embodiments of the subject matter described in this specification can be implemented so as to realize one or more of the following advantages. A search system can determine when it is likely that a document responsive to a search query has changed, or when the user intent behind a query has changed, and can accordingly modify data indicating past user behavior that is used to rank the search result. When a document changes, the document can be ranked using signals that more closely represent the current content of the document, and not past content of the document. When the user intent behind a query changes, search results can be ranked in a manner that more closely represents the current user intent, rather than historical user intent. When a document or user intent behind a query for the document has changed, other documents related to the document can be ranked using signals that more closely represent the current contents of the related documents, or current user intent.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
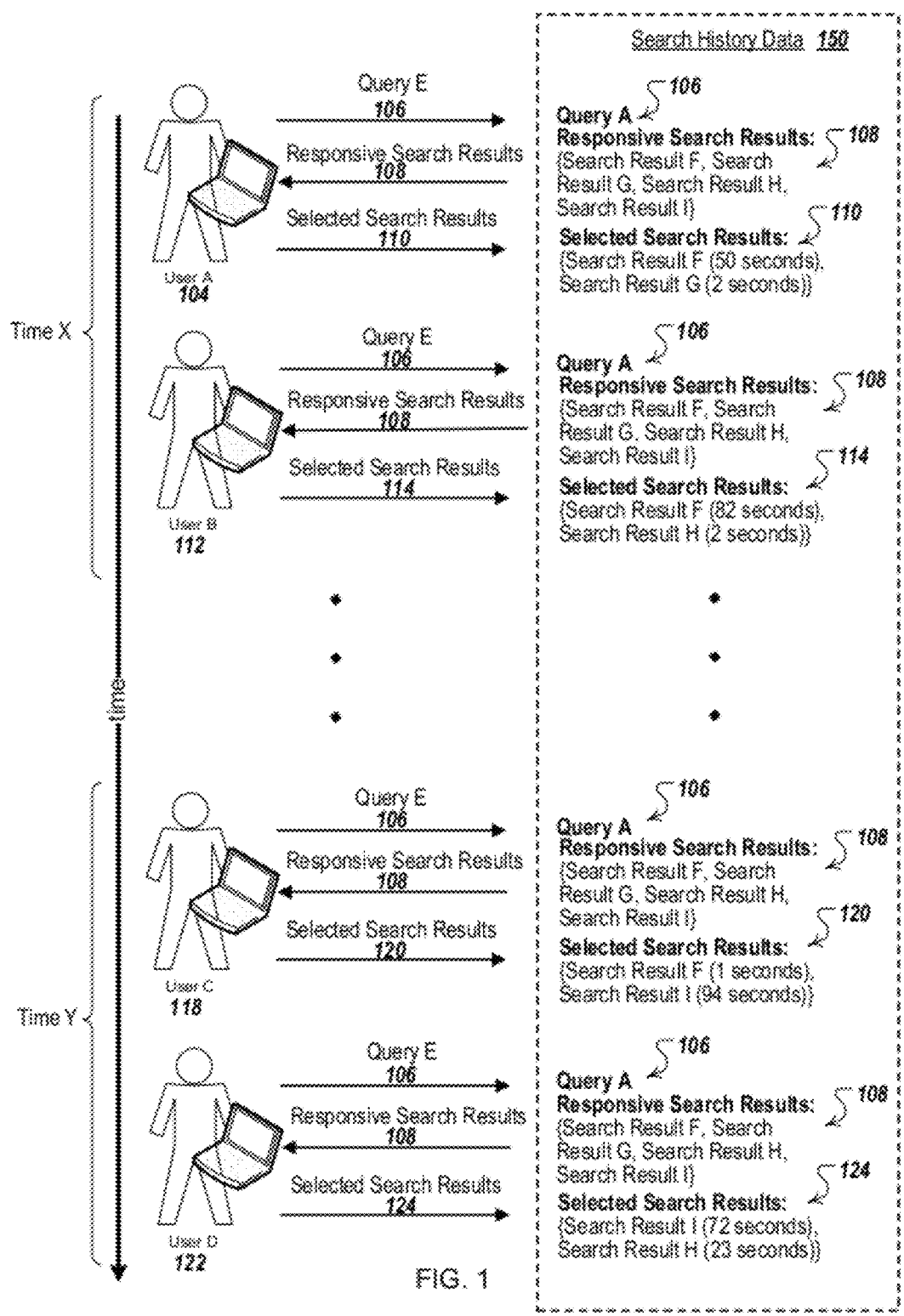
FIG. 1 illustrates sample interactions between users and a search system over time, and search history data that is collected during the interactions.

FIG. 1 illustrates sample interactions between users and a search system over time, and search history data that is collected during the interactions. Over time, a plurality of users (e.g., User A 104, User B 112, User C 118, and User D 122) submit queries to a search engine, receive responsive search results from a search engine, and select (e.g., click, with a mouse or other input device, including tactile and audio input devices) one or more search results. For example, User A 104 submits query E 106, receives responsive search results 108 (including search result F, search result G, search result H, and search result I), and selects the selected search results 110 (including search result F and search result G).

Over time, users may begin to select different search results in response to a query. For example, User A 104, User B 112, User C 118, and User D 122 all submit the same query (Query E 106) and receive the same or similar responsive search results 108, but each selects a different set of search results from the responsive search results. User A 104's selected search results 110 include search result F (viewed for 50 seconds) and search result G (viewed for 2 seconds). User B 112's selected search results 114 include search result F (viewed for 82 seconds) and search result H (viewed for 2 seconds). Both User A 104 and User B 112 viewed search result A for a relatively long period of time. At a later time, user C 118 and user D 122 also submit a search query for query E 106, receive the responsive search results 108, and select selected search results 120 and 124. User C 118's selected search results 120 include search result F (viewed for only 1 second) and search result I (viewed for 94 seconds). User D 122's selected search results 124 include search result I (viewed for 72 seconds) and search result H (viewed for 23 seconds). Thus, both User C 118 and User D 122 viewed search result I for a relatively long period of time, but neither viewed search result F for long.

Changes in user search result preferences over time can arise from various reasons. Sometimes, differences between individual users are due to the fact that the users have different interests, and therefore will select different search results. However, when differences arise in aggregated user selections (e.g., aggregation of selections by multiple users), the differences can be an indication that either the document corresponding to the search result, or the intent behind the query, has changed. Search results can change, for example, when the document is modified or replaced. For example, a webpage owner can modify a document by adding or removing content, or completely replacing a page. For example, when a new company buys an existing company, the new company may change the existing company's webpage to include the new company's products and information, or to remove information about obsolete products. The intent behind a query can change, for example, when the public's reason for issuing the query changes. For example, search queries for a sports star's name usually seek information about the star's statistics or team or upcoming games. However, if the sports star is involved in a scandal, then queries for the sport star's name might seek information about the scandal. As another example, when a user queries for an annual event, for example, the "Escape from Alcatraz" triathlon held in San Francisco, Calif. each year, the user generally wants the most recent page for the event, and not pages describing previous years' events. Therefore, the intent behind the query changes each year, because the user wants pages for the current year.

One way to differentiate between mere differences in user preferences and a change to the document (or the intent behind a query), can be to look at selection data aggregated over time. For example, as users submit queries, receive search results, and select search results, a system (e.g., the search engine that is receiving queries and generating responsive search results) tracks user queries, responsive results, and user selections in search history data 150. For example, when User A 104 submits query E 106, receives responsive search results 108, and selects the selected search results 110, the collected search history data 150 includes query E 106, the responsive search results 108, and the selected search results 110. This data can then be analyzed in the aggregate to determine what is a statistically significant change in user behavior, and what is just noise in the data.

Figure 2:
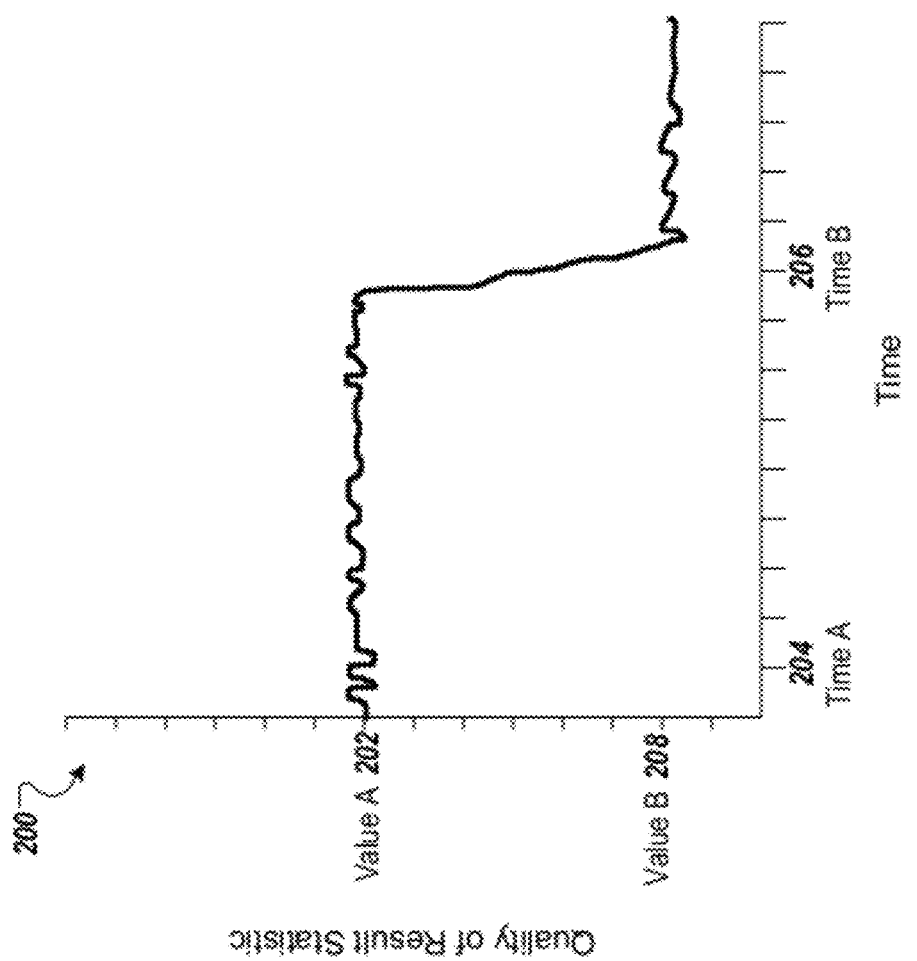
FIG. 2 illustrates an example graph of aggregate search history data for a given document as a search result for a given search query, over time.

FIG. 2 illustrates an example graph 200 of aggregate search history data for a given document as a search result for a given search query, over time. The aggregate search history data is represented as a quality of result statistic for the document and a search result for the query. In general, the quality of result statistic estimates how responsive users found a given document to be as a search result for a given query and is calculated from aggregate click data for a population of users. Various heuristics for calculating the quality of result statistic are described in more detail below with reference to FIG. 5.

As shown in FIG. 2, the quality of result statistic remains around value A 202 from time A 204 until around time B 206, at which point, the quality of result statistic drops to value B 208, where it remains for the rest of the time shown on the graph. This drop in the quality of result statistic indicates that there has been a change in user behavior toward the query and the document, and thus it is likely that either the document, or user interest in the document, has changed.

Figure 3:
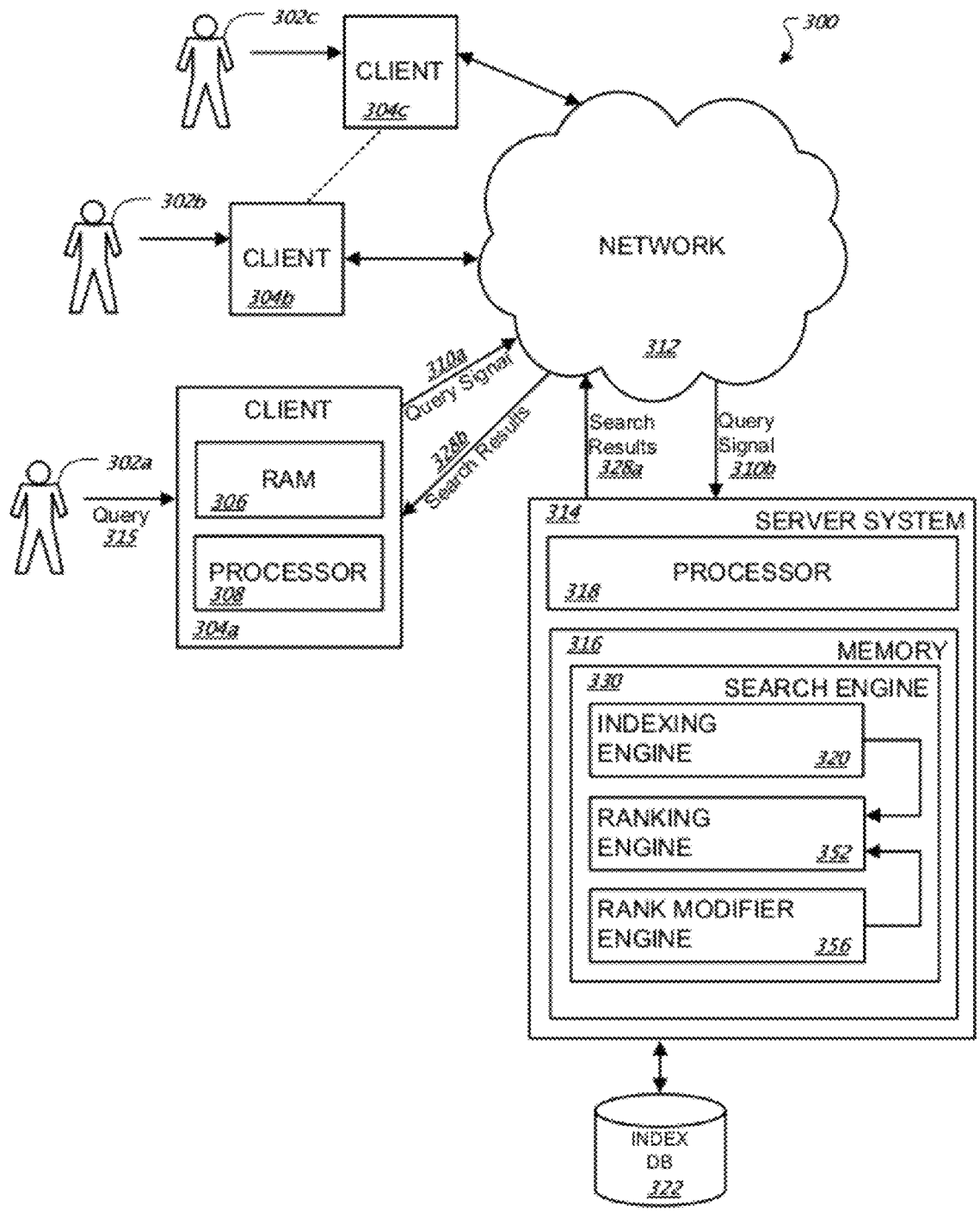
FIG. 3 illustrates an example search system.

FIG. 3 illustrates an example search system 300 for identifying search results in response to search queries as can be implemented in an internet, intranet, or other client/server environment. The system 300 is an example of an information retrieval system in which the systems, components and techniques described below can be implemented. Although several components are illustrated, there may be fewer or more components in the system 300. Moreover, the components can be distributed on one or more computing devices connected by one or more networks or other suitable communication mediums.

A user 302 (302a, 302b, 302c) interacts with the system 300 through a client device 304 (304a, 304b, 304c) or other device. For example, the client device 304 can be a computer terminal within a local area network (LAN) or wide area network (WAN). The client device 304 generally includes a random access memory (RAM) 306 (or other memory and/or a storage device) and a processor 308. The processor 308 is structured to process instructions within the system 300. In some implementations, the processor 308 is a single-threaded processor. In other implementations, the processor 308 is a multi-threaded processor. The processor 308 can include multiple processing cores and is structured to process instructions stored in the RAM 306 (or other memory and/or a storage device included with the client device 304) to display graphical information for a user interface.

A user 302a connects to the search engine 330 within a server system 314 to submit a query 315. When the user 302a submits the query 315 through an input device attached to a client device 304a, a client-side query signal 310a is sent into a network 312 and is forwarded to the server system 314 as a server-side query signal 310b. Server system 314 can be one or more server devices in one or more locations. A server device 314 includes a memory device 316, which can include the search engine 330 loaded therein. A processor 318 is structured to process instructions within the device 314. These instructions can implement one or more components of the search engine 330. The processor 318 can be a single-threaded processor or a multi-threaded processor, and can include multiple processing cores. The processor 318 can process instructions stored in the memory 316 related to the search engine 330 and can send information to the client device 304, through the network 312, to create a graphical presentation in a user interface of the client device 304 (e.g., a search results web page displayed in a web browser).

The server-side query signal 310b is received by the search engine 330. The search engine 330 uses the information within the user query 315 (e.g. query terms) to find relevant documents. The search engine 330 can include an indexing engine 320 that actively searches a corpus (e.g., web pages on the Internet) to index the documents found in that corpus, and the index information for the documents in the corpus can be stored in an index database 322. This index database 322 can be accessed to identify documents related to the user query 315. Note that, an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in file.

The search engine 330 includes a ranking engine 352 to rank the documents related to the user query 315. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. Appropriate techniques can also be taken to identify and eliminate attempts to cast false votes so as to artificially drive up the relevance of a page.

To further improve such traditional document ranking techniques, the ranking engine 352 receives one or more additional signals from a rank modifier engine 356 to assist in determining an appropriate ranking for the documents. The rank modifier engine 356 provides one or more measures of relevance for the documents, which can be used by the ranking engine 352 to improve the search results' ranking provided to the user 302.

The search engine 330 forwards the final, ranked result list within a server-side search results signal 328a through the network 312. Exiting the network 312, a client-side search results signal 328b are received by the client device 304a where the results are stored within the RAM 306 and/or used by the processor 308 to display the results on an output device for the user 302a.

The server system 314 may also maintain one or more user search histories based on the queries it receives from a user and which results a user selected after a search was performed.

Figure 4A:
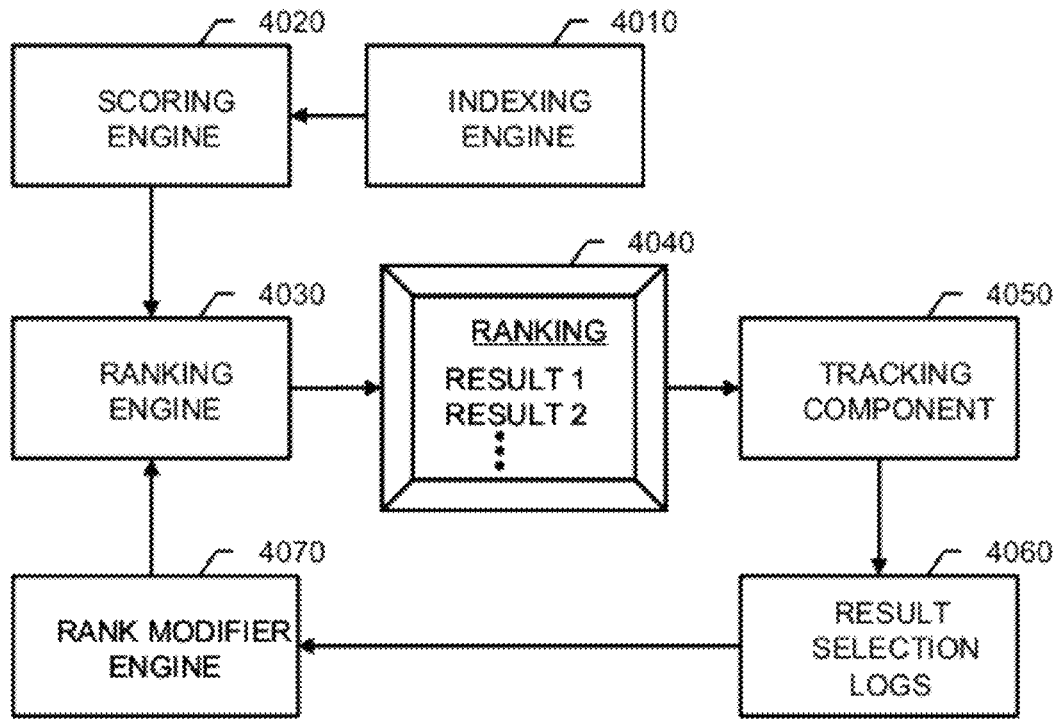
FIG. 4A illustrates example components of an information retrieval system.

FIG. 4A illustrates example components of an information retrieval system. These components include an indexing engine 4010, a scoring engine 4020, a ranking engine 4030, and a rank modifier engine 4070. The indexing engine 4010 functions as described above for the indexing engine 320. The scoring engine 4020 generates scores for document results based on many different features, including content-based features that link a query to document results, and query-independent features that generally indicate the quality of documents results. The content-based features include, for example, aspects of document format, such as query matches to title or anchor text in an HTML (Hyper Text Markup Language) page. The query-independent features include, for example, aspects of document cross-referencing of the document or the domain. Moreover, the particular functions used by the scoring engine 4020 can be tuned, to adjust the various feature contributions to the final IR score, using automatic or semi-automatic processes.

The ranking engine 4030 produces a ranking of document results 4040 for display to a user based on IR scores received from the scoring engine 4020 and one or more signals from the rank modifier engine 4070. The rank modifier engine 4070 provides one or more measures of relevance for the documents, which can be used by the ranking engine 4030 to improve the search results' ranking provided to the user. A tracking component 4050 is used to record information regarding user behavior such as individual user selections of the results presented in the ranking 4040. In some implementations, the tracking component 4050 is embedded JavaScript code included in a web page ranking 4040 that identifies user selections of individual document results and also identifies when the user returns to the results page, thus indicating the amount of time the user spent viewing the selected document result. In other implementations, the tracking component 4050 is a proxy system through which user selections of the document results are routed. The tracking component can also include pre-installed software at the client (e.g., a toolbar plug-in to the client's operating system). Other implementations are also possible, for example, an implementation that uses a feature of a web browser that allows a tag/directive to be included in a page, which requests the browser to connect back to the server with message(s) regarding link(s) clicked by the user.

The recorded information is stored in result selection logs 4060. In various implementations, the recorded information includes log entries that indicate user interaction with each result document presented for each query submitted. For each user selection of a result document presented for a query, the log entries indicate the query (Q), the document (D), the user's dwell time (T) on the document, the language (L) employed by the user, and the country (C) where the user is likely located (e.g., based on the server used to access the IR system) and a region code (R) identifying the metropolitan area of the user. The log entries also records negative information, such as the fact that a document result was presented to a user, but was not selected. Other information such as position(s) of click(s) (i.e., user selection(s)) in the user interface, information about the session (e.g., existence and type of previous clicks, and post-click session activity), IR scores of clicked results, IR scores of all results shown before click, the titles and snippets shown to the user before the click, the user's cookie, cookie age, IP (Internet Protocol) address, user agent of the browser, and so on, can also be recorded.

In various implementations, the time (T) between the initial click-through to the document result and the user's returning to the main page and clicking on another document result (or submitting a new search query) is also recorded. An assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

The components shown in FIG. 4A can be combined in various manners and implemented in various system configurations. For example, the scoring engine 4020 and the ranking engine 4030 can be merged into a single ranking engine, such as the ranking engine 352 of FIG. 3. The rank modifier engine 4070 and the ranking engine 4030 can also be merged, and in general, a ranking engine includes any software component that generates a ranking of document results after a query. Moreover, a ranking engine can be included in a client system in addition to (or rather than) in a server system.

Figure 4B:
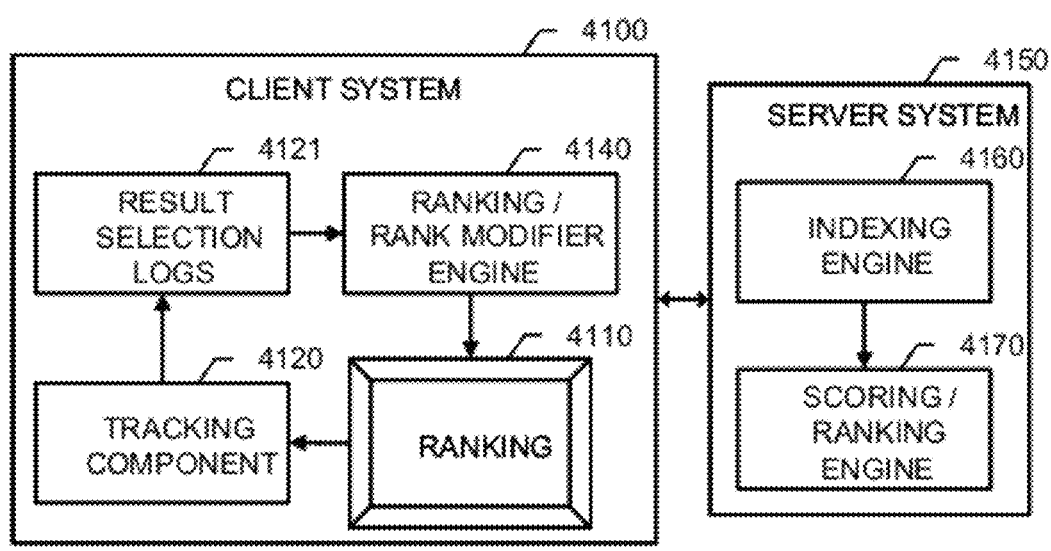
FIG. 4B illustrates another example information retrieval system.

FIG. 4B illustrates another example information retrieval system. In this system, a server system 4150 includes an indexing engine 4160 and a scoring/ranking engine 4170. A client system 4100 includes a user interface 4110 for presenting a ranking, a tracking component 4120, result selection logs 4121 and a ranking/rank modifier engine 4140. For example, the client system 4100 can include a company's enterprise network and personal computers, in which a browser plug-in incorporates the ranking/rank modifier engine 4140. When an employee in the company initiates a search on the server system 4150, the scoring/ranking engine 4170 can return the search results along with either an initial ranking or the actual IR scores for the results. The browser plug-in then re-ranks the results locally based on tracked page selections for the company-specific user base.

Figure 5:
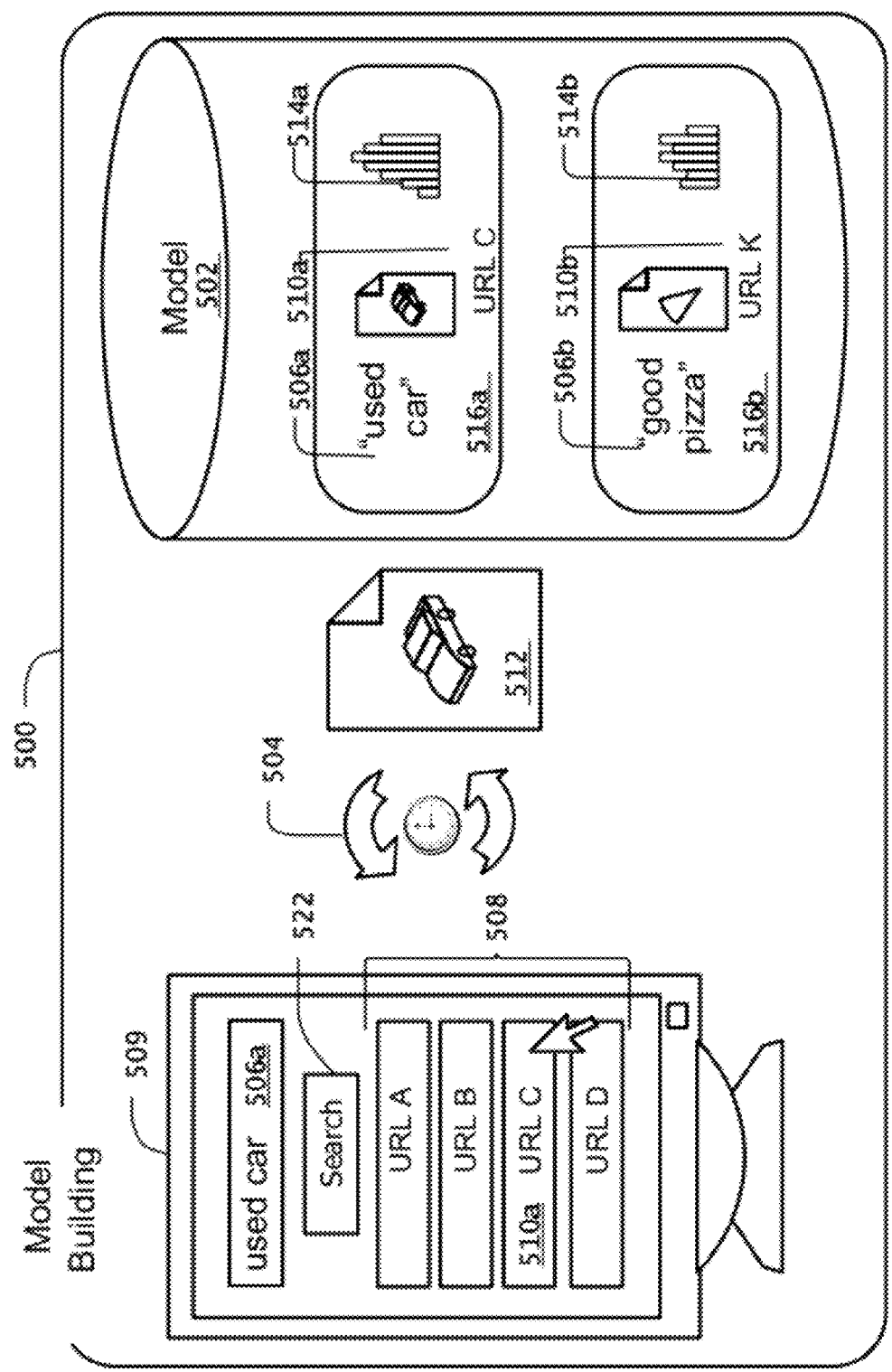
FIG. 5 illustrates building an example model database for use with an information retrieval system.

FIG. 5 illustrates building an example model database 502 for use with an information retrieval system. The model database 502 is one or more databases that aggregate information indicative of user behavior on at least a per-query and per-document basis. In various implementations, information in the model database 502 is used as input to a process that ranks documents or enhances the ranking of documents. For example, the model information can be used as input to interactive or non-interactive Internet search engines, image search engines, video search engines, book search engines, consumer product search engines, other suitable processes capable of ranking documents, and combinations of these. In various implementations, a document is referenced by a universal resource locator (URL) in the model database 502; however, other types of document references are possible. For instance, a document can be a webpage on the World Wide Web referenced by a URL, or can be referenced by a globally unique user identifier (GUID) determined by the information retrieval system.

As shown in FIG. 5, a user submits a query 506a "used car," for example, to an information retrieval system, such as a search engine, through a graphical user interface 509, as presented on a personal computer, a mobile telephone, or other device. A query includes one or more terms. For example, a query can include the terms "bus," "river" and "hotel." In addition to dictionary words, terms can include special characters, numbers, mathematical expressions, Boolean expressions, slang terms, names, titles, images, sounds, videos, other suitable query terms, and combinations of these. Moreover, query terms can be in more than one language.

In response to the user selecting the search button 522, for example, a search engine returns a ranking or result list 508 which is an ordered list of references to documents that are responsive to the query 506a. The result list 508 includes a set of document references URL A, URL B, URL C (501a), and URL D. The result list 508 can contain the text of the URL itself, a short description of the information found within each document, a snapshot of the portion of the document which contains the query, other suitable information, or a combination of these. If a user selects (e.g., clicks) URL C 510a from the result list 508, for example, the selected URL can cause the user interface 509 (e.g., a web browser) to present the associated document 512. Once the user has finished viewing the document, the user can navigate back to the result list 508.

In various implementations, the model database 502 is built as users interact with search engines. Each presentation of a document reference in the result list in response to a query is recorded as an "impression" of the referenced document in connection with the query. Other standards for recording impressions can also be used. For example, an impression can be recorded when a user selects the document, or a document below the document in the result list. An impression can also be recorded when a user selects the document directly above the document in the result list. In some implementations, a weighted count of impressions is calculated for each document presented in response to the query. For example, if a user selects the document or a document below the document in the result list, 1 is added to the weighted count. If a user selects a document above the document, a value of less than 1 is added to the weighted count. The value can be a constant or can be determined, for example, by dividing 1 by the number of documents between the document and the selected document in the search result list.

Each selection of the presented document reference is recorded as a "click" for the document in connection with the query. A timer can be used to track how long a user views or "dwells" on the document. For example, a longer time spent dwelling on a document (i.e., a long click) can indicate that a user found the document to be relevant for the query. A brief period viewing a document (i.e., a short click) can be interpreted as a lack of document relevance. In some implementations, the click data 514 is a count of clicks of all types (e.g., long, short) for a particular query 506 and document 510 combination. In some implementations, the click data 514 includes a count of each click type (e.g., long, short) for a particular query 506 and document 510 combination. Aggregated click data from queries for a given document can be used to generate a quality of result statistic for the document as a search result for the query. In general, the quality of result statistic estimates how responsive users found a given document to be as a search result for a given query. The quality of result statistic can be used to rank or enhance a ranking of the document.

Various heuristics for calculating the quality of result statistic can be used. For example, a quality of result statistic can be an average of the weighted long clicks for a given document and query pair, a sum of the weighted clicks for a given document and query pair, or a click fraction for a given document and query pair. Various weights are also possible, for example, the clicks can be weighted by the length of the clicks, by how quickly a user clicked on a result, and whether a user clicked on a result first, second, third, etc. Various types of click fractions are possible. For example, in some implementations, the click fraction is calculated by dividing the number of clicks (or the number of weighted clicks) by the number of impressions. In other implementations, the click fraction is calculated by dividing the sum of the weighted clicks by the total number of clicks. In still other implementations, the click fraction is the sum of weighted clicks for the document presented in response to the query divided by sum of weighted clicks for all documents presented in response to the query. Other click fractions are also possible.

A search engine or other process creates a record 516 in the model database 502 for documents that are selected by users in response to a query. Each record 516 within the model 502 (herein referred to as a tuple <document, query, quality of result statistic>) is at least a combination of a query 506 submitted by users, a document reference 510 selected by users in response to that query, and an aggregation of click data 514 for all users that select the document reference 510 in response to the query 506. The aggregated click data is viewed as an indication of document relevance. In various implementations, model data is specific to a geographic location (e.g., a city, metropolitan region, state, country, or continent), specific to a language preference of users (e.g., as specified by the users in a profile or as determined from user search behavior, for example, the language of the queries issued by the user), or specific to a locale (e.g., specific to a geographic location or a set of geographic locations, and optionally a language preference). Other extensions of model data are possible.

Figure 6:
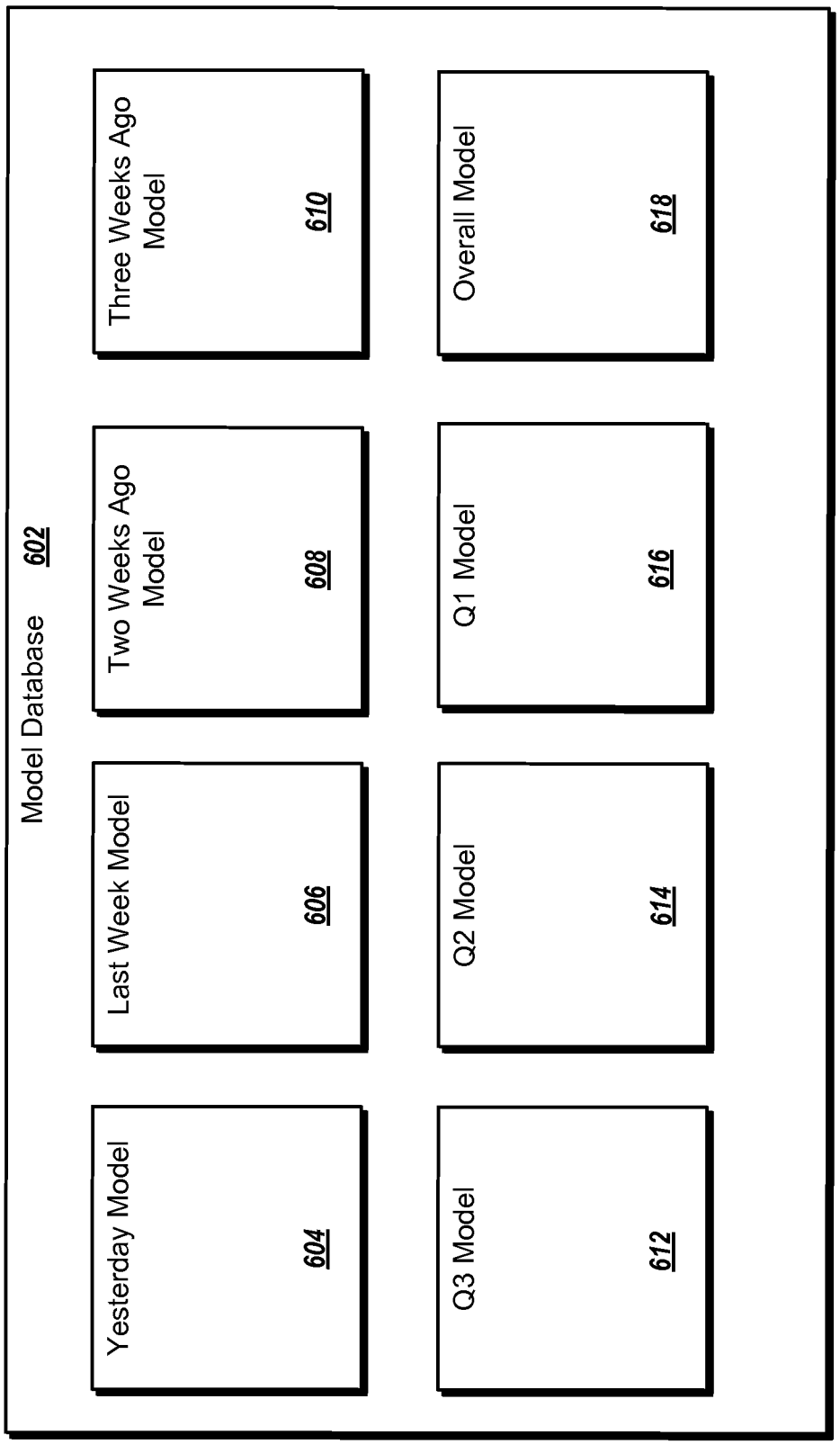
FIG. 6 illustrates an example model database.

FIG. 6 illustrates an example model database 602. The model database 602 includes separate models corresponding to data gathered during different periods of time. Each model can be built, for example, using data gathered as described above with reference to FIG. 5. By way of illustration, the model database 602 includes a yesterday model 604 that corresponds to click data gathered during the previous day, a last week model 606 that corresponds to click data gathered during the previous week, a two weeks ago model 608 that corresponds to click data gathered two weeks ago, a three weeks ago model 610 that corresponds to click data gathered three weeks ago, a Q3 model 612 that corresponds to click data gathered during the past quarter, a Q2 model 614 that corresponds to click data gathered during the quarter before Q3, a Q1 model that corresponds to data gathered during the quarter before Q2, and an overall model 618. The overall model 618 corresponds to all remaining model data, for example, all past data that has been collected during a period of time before the time represented by the smaller models, or a subset of the past data (e.g., data from a threshold number of years). The division of the model database 602 into multiple smaller models can increase performance when data needs to be retrieved from the models and can be used to identify changes in user behavior over time. Other divisions of the model database are also possible, for example, models corresponding to fortnights, models corresponding to months, or models corresponding to periods of hours can also be used. Other ways of storing quality of result statistics corresponding to discrete periods of time are also possible. For example, the model database could alternatively store click data for periods of equal length, such as weeks or months.

The individual models in the model database 602 are periodically updated as time goes by. For example, the yesterday model 604 is replaced each day by a model built from new data for the day before.

In some implementations, the models only include data that satisfies a threshold (e.g., corresponds to a threshold number of clicks or has a quality of result statistic that exceeds a threshold). The threshold can be different for models corresponding to different periods of time. For example, the models corresponding to the shortest period of time can have the highest thresholds, while the models corresponding to longer periods of time can have longer thresholds.

In general, a rank modifier engine (e.g., the rank modifier engine 356 described above with reference to FIG. 3) generates an initial quality of result statistic from the model data, and then modifies the data based on a difference between model data at different time periods. In some implementations, the rank modifier engine uses just the data from a single model (e.g., the overall model 618) to generate an initial quality of result signal for a given query and a document.

In other implementations, the rank modifier engine generates the original quality of result statistic for a given query and document by merging data in the individual models (corresponding to data collected during different periods of time) on an individual document and query basis. The merging can be done in advance (e.g., before any search results are ranked), or can be done in real time, in response to a user query. In general, the rank modifier engine merges the models in order of most recent to least recent. Data from the models is combined, for example, by taking a weighted sum of the data. The data from the most recent model is assigned a weight of one.

Data in the older models are weighted. The weights are determined from the query popularity in the models and/or how old the data in the models is. In some implementations, the more click data that is included in the merged models (e.g., how popular the query has been in the newer models), the lower the weights for older models will be. In some implementations, the weights are based only on click data for a geographic language, location, or locale associated with the user.

In some implementations, models are segmented into "safe" and "unsafe" models depending on the length of time associated with the each model. Models that correspond to shorter periods of time are considered "unsafe," because they are more susceptible to spam, where users try to influence search rankings by submitting queries and clicking on results to create an artificial increase in rankings. To counteract this, in some implementations, unsafe models are merged first. When the rank modifier engine processes the first safe model, it examines the data in the safe model for the query and the document, and if there is insufficient data (e.g., less than 50 clicks, or a quality of result statistic that is less than 1%), the system resets the merged model to the quality of result statistic for the safe model.

Figure 7:
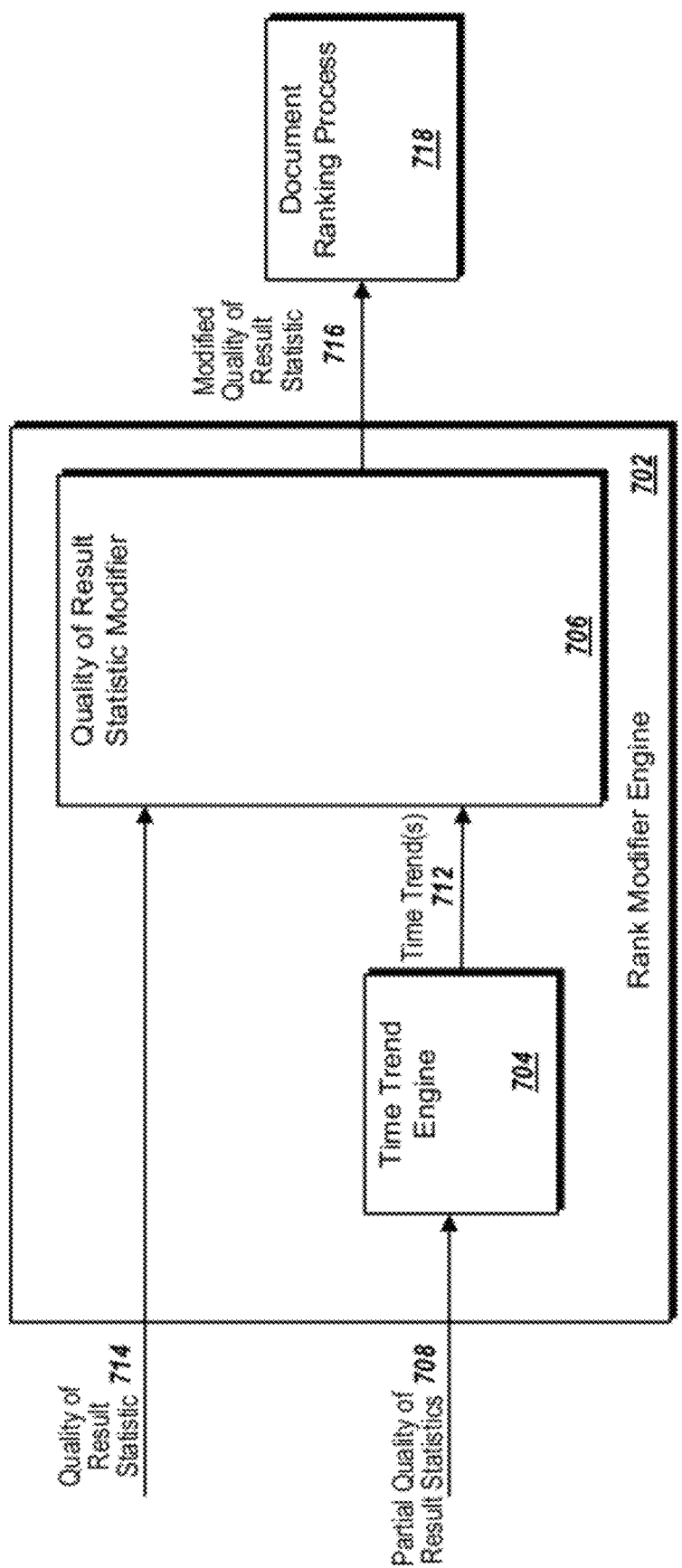
FIG. 7 illustrates an example rank modifier engine that provides one or more signals to a document ranking process.

FIG. 7 illustrates an example rank modifier engine 702 that provides one or more signals to a document ranking process 718. The rank modifier engine 702 can generate the signal(s) in real-time (e.g., when a document needs to be ranked), or can generate the signal(s) in advance and store them for later use. The rank modifier engine 702 generates the signal(s) by modifying an initial quality of result statistic for a query and a document according to time trend statistics generated from quality of result statistics for the query and the document are calculated from data gathered during different time periods.

The rank modifier engine 702 consists of a time trend engine 704 and a quality of result statistic modifier 706. The boxes shown in FIG. 7 logically represent executing software components or modules. These components can be combined or subdivided in ways other than those shown in FIG. 7 and can be distributed on two or more computing devices.

The time trend engine 704 receives a series of quality of results statistics 708 corresponding to different time periods, and calculates one or more time trends from the quality of results statistics. These trends indicate changes in the quality of result statistics over time. Each quality of result statistic corresponds to a specific time period during which the relevant data is gathered. Various time periods can be used, for example, different weeks in the model. In some implementations, the time trend engine 704 calculates time trends for different types of quality of result statistics for the different time periods, and then combines the time trends. For example, the time trend engine 704 can calculate time trends for different types of quality of result statistics for the same time periods, and then take a weighted sum of the trends. The weights can be determined empirically, for example, based on a determination of how susceptible the different types of quality of result statistics are to small changes in user behavior, or small changes in the way search results are presented. For example, the number of clicks on a given search result is often influenced by where the search result falls in an ordered list of search results. Therefore, statistics based on raw number of clicks would be given lower weight relative to statistics based on how long users viewed a search result. In some implementations, the quality of result statistics are retrieved from models in the model database 602. However, other sources of the quality of result statistics are also possible.

The time trend engine 704 calculates various time trends. In some implementations, the time trend engine 704 calculates the difference between two quality of result statistics corresponding to different time periods. The time trend engine 704 can also calculate other time trends, for example, the time trend engine can determine whether there is a constant increasing trend in the values for the quality of result statistics over time, or whether there is a constant decreasing trend in the values for the quality of result statistics over time. Alternatively, or additionally, the time trend engine can identify that there have been one or more spikes in the quality of result statistics over time. A spike occurs when the quality of result statistics over time have a sudden, and brief, increase in value.

The quality of result statistic modifier 706 receives a quality of result statistic 714 for the query and the document along with the one or more time trends 712 and generates a modified quality of result statistic 716 by scaling or modifying the quality of result statistic 714 by a factor. The factor is derived from the one or more time trend statistics 712. For example, when the one or more time trend statistics 712 is a difference between the two quality of result statistics corresponding to different time periods, the factor can be the difference or can be the result of a sigmoid function that takes the difference as input, or can be the result of a step function with a value of 1 if the difference is less than a threshold, and a value of 0 if the difference is greater than the threshold. In these implementations, the determination that there is a difference between the two time periods is taken as an indication that either the document, or the user intent behind the document, has changed. Therefore, the modified quality of result statistic effectively discounts the weight given to the quality of result signal for the document and the query during ranking, and, in some cases, completely eliminates the signal as a factor used in ranking. In some implementations, the factor is further based on a measure of how statistically significant the difference is (e.g., the more statistically significant the difference, the more the factor discounts the quality of result statistic). Other ways of determining the factor are also possible.

As another example, when the one or more time trend statistics 712 include an indication that the quality of result statistics are decreasing in value over time, the factor can be derived by the rate at which the statistics are decreasing, and can be selected to result in a discounted quality of result statistic. In these implementations, the determination that there is a decrease in the quality of result statistics over time is taken as an indication that the document is becoming less relevant to the intent behind the user query (either because of changes in the document or changes in the intent), and therefore, the document and query should have a lower quality of result statistic.

As yet another example, when the one or more time trend statistics 712 include an indication that there was a prior spike in the quality of result statistics and this spike was followed by a decrease in the value of the quality of result statistics, the factor can be selected to discount the quality of result statistic. For example, the factor can be selected to eliminate all data for the document and the query. This factor selection reflects the idea that the data is no-longer accurate. As another example, the factor can be selected to eliminate all data for the document and the query that was collected before the spike began, or through the time that the spike ended. This factor selection reflects the idea that the data before (or through) the spike is no-longer accurate, because something caused user behaviors to change. As yet another example, when the quality of result statistic for the query and the document is larger than the quality of result statistic for the query and other documents, the factor can be selected to reduce the quality of result statistic for the query and the document to be the maximum quality of result statistic for the query and the other documents. This factor selection reflects the idea that while the quality of result statistic for the query and the document should be valued, the document should not be considered better than all other documents responsive to the query, because there has been a change in user behavior.

As still another example, when the one or more time trend statistics 712 include an indication that the quality of result statistics are increasing in value over time, the factor can be a positive factor derived, for example, by the rate at which the statistics are increasing. In these implementations, the determination that there is an increase in the quality of result statistics over time is taken as an indication that the document is becoming more relevant to the intent behind the user query (either because of changes in the document or changes in the intent), and therefore, the document and query should have a higher quality of result statistic.

The quality of result statistic modifier 706 provides the modified quality of result statistic to a document ranking process 718. The document ranking process 718 uses the modified quality of result statistic in place of the original quality of result statistic 714.

Figure 8:
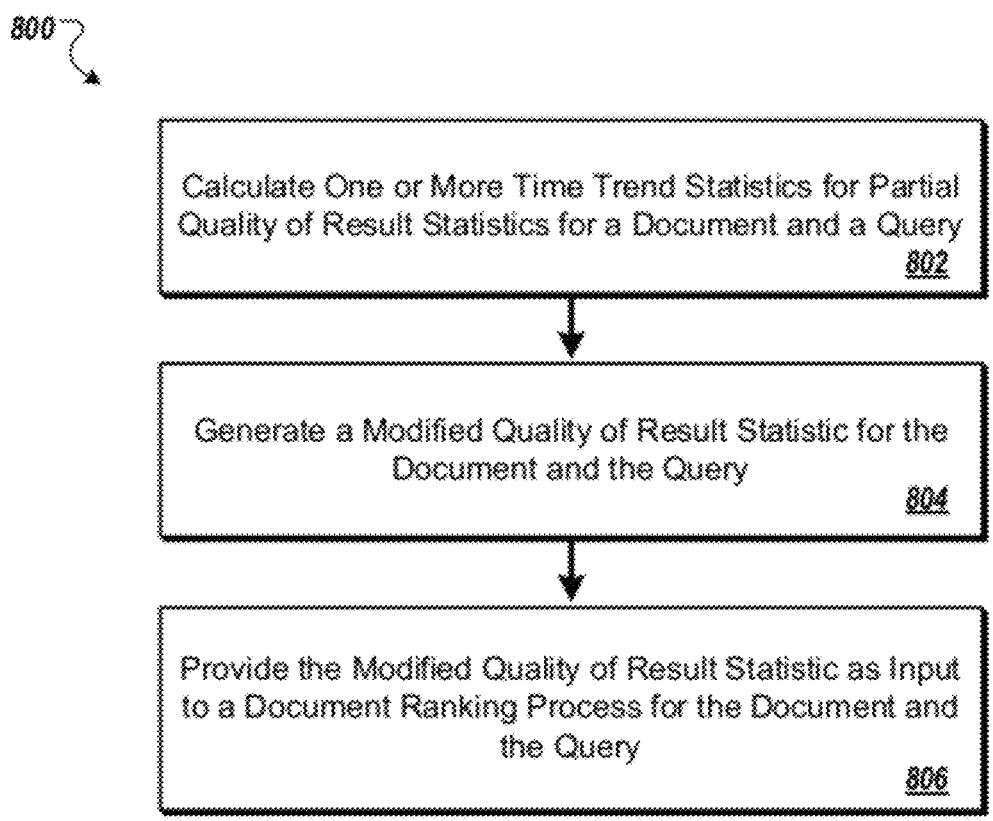
FIG. 8 illustrates an example technique for modifying a quality of result statistic for a document and a query.

FIG. 8 illustrates an example technique 800 for modifying a quality of result statistic for a document and a query. For convenience, the example technique 800 will be described in reference to a system that performs the technique 800. The system can be, for example, the rank modifier engine 702.

The system calculates one or more time trend statistics for quality of result statistics for a document and a query (step 802), for example, as described above with reference to FIG. 7. Various heuristics for calculating the quality of result statistics, similar to the heuristics used to calculate the quality of result statistics, can be used. In general, each of the quality of result statistics are calculated using the same heuristic. In some implementations, each quality of result statistic estimates a percentage of users that found the document relevant to the query out of a total number of users who viewed the document as a search result for the query during the respective time period. For example, the first and second quality of result statistics can correspond to the number of long clicks on the document during the respective time periods divided by the number of impressions during the respective time periods. Other heuristics can also be used, for example, the heuristics for calculating a quality of result statistic described above with reference to FIG. 5, as well as the number of other documents viewed after the user viewed the document, the number of query refinements used by the user to find fresher documents (e.g., documents that have been modified more recently than the document) after the user viewed the document, or the number of fresher documents viewed after the user viewed this document and the number of older results viewed after the user viewed this document. In some implementations, the system calculates the time trend statistics for quality of result statistics aggregated across multiple queries. For example, the system can identify related queries, aggregate their quality of result statistics, and calculate the time trend statistics from the aggregated quality of result statistics. The system identifies queries as related, for example, by identifying query refinements from a query log, analyzing the syntactic structure of the queries, identifying semantically similar queries, or identifying all of the queries for which the document was selected. Similarly, the system can calculate the time trend statistics from a comparison of quality of result statistics aggregated across multiple documents (e.g., other documents that are similar to the document). Similar documents can be, for example, documents that are from the same web site, documents that were created or updated at the same time, documents with similar content, or documents that were selected in response to a query during the same period of time.

The system generates a modified quality of result statistic for the document and the query (step 804), for example, as described above with reference to FIG. 7.

In some implementations, before the system modifies the quality of result statistic, it performs one or more checks to verify that the one or more time trend statistics indicate a change in the document (or a change to user intent behind the query) that is large enough to justify modifying the data. For example, in some implementations, the system verifies that the one or more time trend statistics satisfy a statistically significant threshold (e.g., is statistically significant).

In some implementations, the system compares a past version of the document from the first time period to a past version of the document from the second time period to verify that the document changed between the two time periods (and optionally, that the change was significant). The system can store the content of past versions of documents, for example, in an index maintained by the search engine.

The system can use various document similarity techniques. The selected similarity technique can compare the entire text of both documents, or text from the significant parts of the documents (e.g., the parts of the documents that are significant for ranking purposes).

In some implementations, the system extracts shingles (e.g., contiguous subsequences of tokens in a document) from each version of the document using, for example, conventional shingle-extracting techniques. The system then generates a similarity score for the two versions from a comparison of the shingles, e.g.:

$$\text{similarity}(A, B) = \frac{S(A) \cap S(B)}{S(A) \cup S(B)},$$

where A is the version of the document from the first time period, B is the version of the document from the second time period, and S(X) is the set of shingles extracted from document X. The system can make various modifications to the above formula. For example, the system can optionally weight the shingles in each set according to their frequency in documents on the Internet, e.g., according to their inverse document frequency, or can use just S(A) in the denominator of the formula in order to increase the importance of the changes to the newer version of the document.

Other techniques for determining similarity are also possible. For example, the system can generate feature vectors from words and phrases appearing in the two versions and generate a similarity score for the two versions from the cosine distance of the vectors. As another example, the system can compare the text or source web pages of anchors (e.g., links) pointing to the document during the first time period, and the text or source web pages of anchors pointing to the document during the second time period to determine that the document has changed over time.

Once the system calculates a similarity score, it can determine if the two versions are different enough by determining whether the similarity score satisfies a threshold (e.g., exceeds a threshold when higher similarity scores indicate greater document difference, or is below a threshold when higher similarity scores indicate higher similarity).

The system provides the modified quality of result statistic as input to a document ranking process for the document and the query (step 806), for example, as described above with reference to FIG. 7.

In some implementations, the system modifies quality of result statistics for the document and other queries (e.g., based on the assumption that the difference in quality of result statistics indicates that the document itself has changed, and therefore, other quality of result statistics for the document should also be modified). For example, in some implementations, the system generates a second modified quality of result statistic for the document and a different query, and provides the second modified quality of result statistic as input to the document ranking process for the first document and the different query. The system can select the different queries in different ways, for example, by selecting queries that are similar to the query. Two queries are similar when they differ only in small differences in spelling, in the use of stop words (e.g., terms such as "a" and "the" that a search engine determines do not contribute to the meaning of the query in the context of the query), in the order of words, or when the terms in one query are replaced by their synonyms in the other query. The system generates the second modified quality of result statistic much as the system generates the modified quality of result statistic in step 804.

In some implementations, the system modifies additional quality of result statistics for other documents and queries related to the document (e.g., based on the assumption that the document itself has changed, therefore the general subject the document is about has changed, and therefore user intent behind queries has also changed). For example, in some implementations, the system identifies another query as related to the document based on a quality of result statistic for the other query and the document. For example, the system can examine queries in an order and pick the first query whose quality of result statistic for the document exceeds a threshold, or the system can pick the query whose quality of result statistic for the document is the highest. The system then generates a third modified quality of result statistic for the other query and a document responsive to the other query, for example, by scaling the quality of result statistic by a factor based on the difference calculated in step 802. The system then provides the third modified quality of result statistic as input to a ranking process for the other query and the document responsive to the other query. The system generates the third modified quality of result statistic much as the system generates the modified quality of result statistic in step 804.

In some implementations, the system permanently replaces quality of result statistics stored in the model database with their corresponding modified quality of result statistics.

Figure 9:
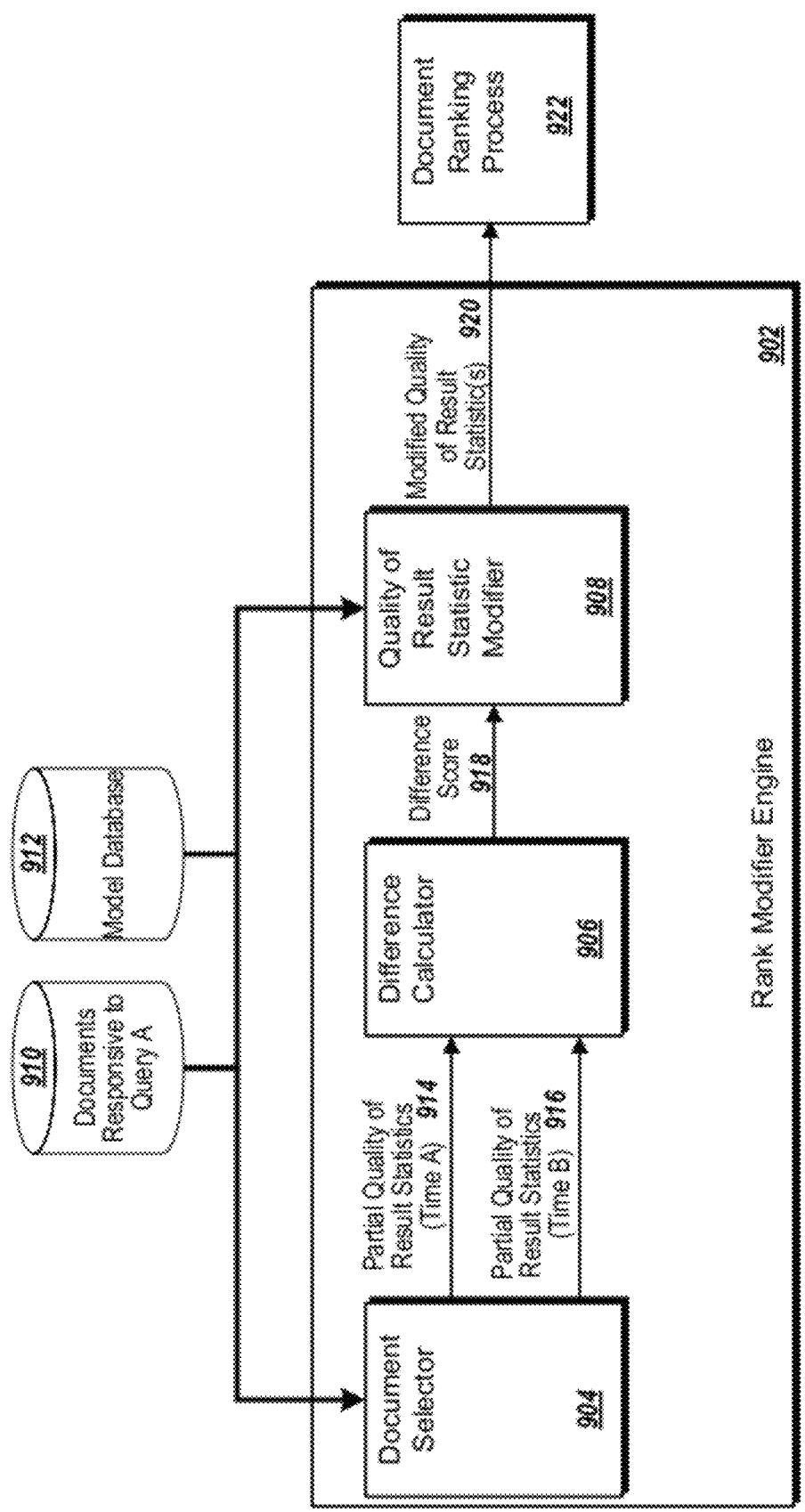
FIG. 9 illustrates another example rank modifier engine that uses differences in quality of result statistics for multiple documents.

FIG. 9 illustrates another example rank modifier engine 902 that uses quality of result statistics for multiple documents responsive to a query. The rank modifier engine 902 calculates the difference between quality of result statistics for several documents as search results for a query, and uses this difference to modify quality of result statistics for documents responsive to the query. This allows the rank modifier engine, for example, to better gauge whether user intent toward the query has changed. Intent is more likely to have changed if user behavior changes towards many documents responsive to the query.

The rank modifier engine 902 includes a document selector 604, a difference calculator 906, and a quality of result statistic modifier 908. The boxes shown in FIG. 9 logically represent executing software components or modules. These components can be combined or subdivided in ways other than those shown in FIG. 9 and can be distributed on two or more computing devices.

The document selector 904 receives an identification of documents responsive to a query (e.g., query A) 910 and a model database (e.g., the model database 602). In some implementations, the document selector receives only the model database 912 and identifies documents responsive to the query from the model database (e.g., by identifying documents with quality of result statistics for the query that satisfy a threshold). The document selector identifies documents responsive to the query and determines quality of result statistics 914 and 916 for two different time periods (e.g., by retrieving them from the appropriate model in the model database 912). The document selector can identify documents responsive to the query using various heuristics. For example, in some implementations, the document selector identifies all documents responsive to the query. In other implementations, the document selector identifies a number of documents having the highest quality of result statistics for the query. The document selector then provides the quality of result statistics to the difference calculator 906.

The difference calculator 906 calculates a difference score 918 from the quality of result statistics. For example, the difference calculator 906 can calculate the cosine distance between two vectors, each containing the quality of result statistics for one of the time periods, or the difference calculator can use the L2 Norm. Alternatively, the difference calculator can calculate a difference score based on, but distinct from, these estimates, for example, the inverse of the cosine distance.

The difference calculator 906 provides the difference score 918 to the quality of result statistic modifier 908. The quality of result statistic modifier 908 identifies one or more documents responsive to the query (e.g., from the documents 910 or the search model database 912) and modifies a quality of result score for each document and the query, much as the result statistic modifier 706 shown in FIG. 7 modifies the quality of result score. The quality of result statistic modifier 908 provides the modified quality of result statistic(s) 920 to a document ranking process 922. In various implementations, the quality of result statistic modifier 908 identifies a single document responsive to the query, a subset of the documents responsive to the query, or all of the documents responsive to the query.

Figure 10:
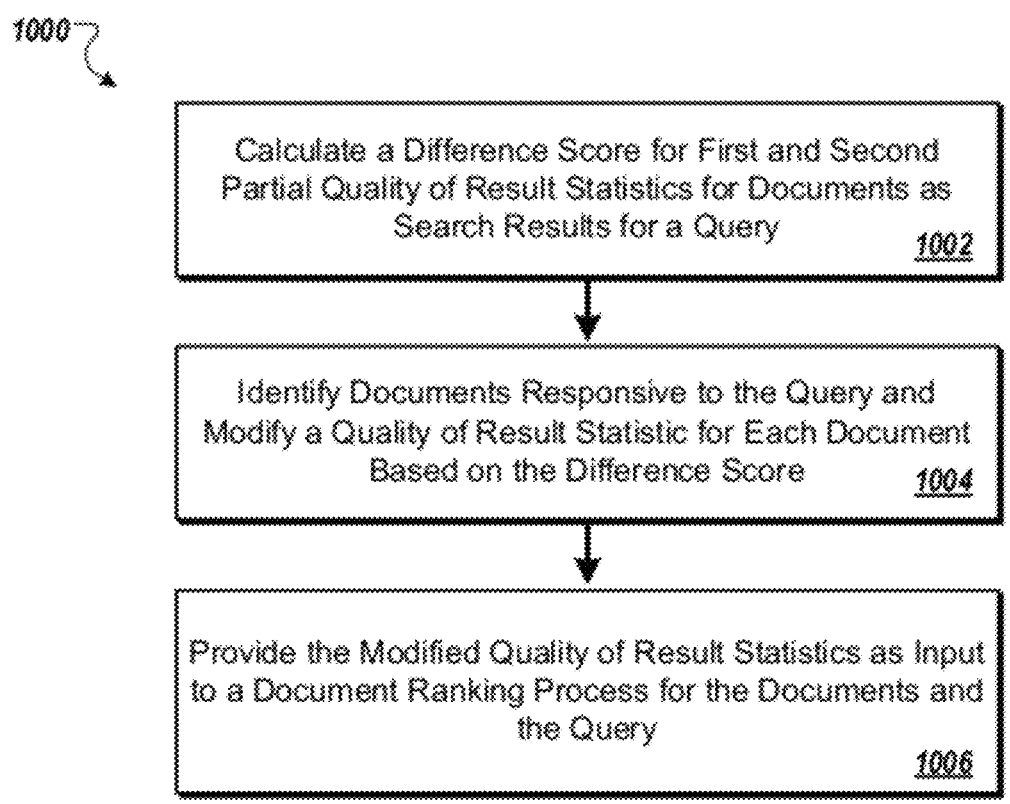
FIG. 10 illustrates another example technique for modifying a quality of result statistic for a document and a query.

FIG. 10 illustrates an example technique 1000 for modifying a quality of result statistic for a document and a query. For convenience, the example technique 1000 will be described in reference to a system that performs the technique 1000. The system can be, for example, the rank modifier engine 902.

The system calculates a difference score for first and second quality of result statistics for documents as search results for a query (step 1002), for example, as described above with reference to FIG. 9. Various quality of result statistics can be used. In general, the first and second quality of result statistics are calculated using the same heuristic. In some implementations, each estimates a percentage of users that interacted with a document presented in response to the query during the relevant time period out of a total number of interactions with documents presented in response to the query during the relevant time period. For example, the first and second quality of result statistics can correspond to the number of long clicks on the document during the respective time periods divided by the number of clicks on all documents presented during the respective time periods. The system identifies one or more documents responsive to the query and modifies a quality of result statistic for each document based on the difference score (step 1004), for example, as described above with reference to FIG. 9. The system provides the modified quality of result statistics as input to a document ranking process for the documents and the query (step 1006), for example, as described above with reference to FIG. 9.

Figure 11:
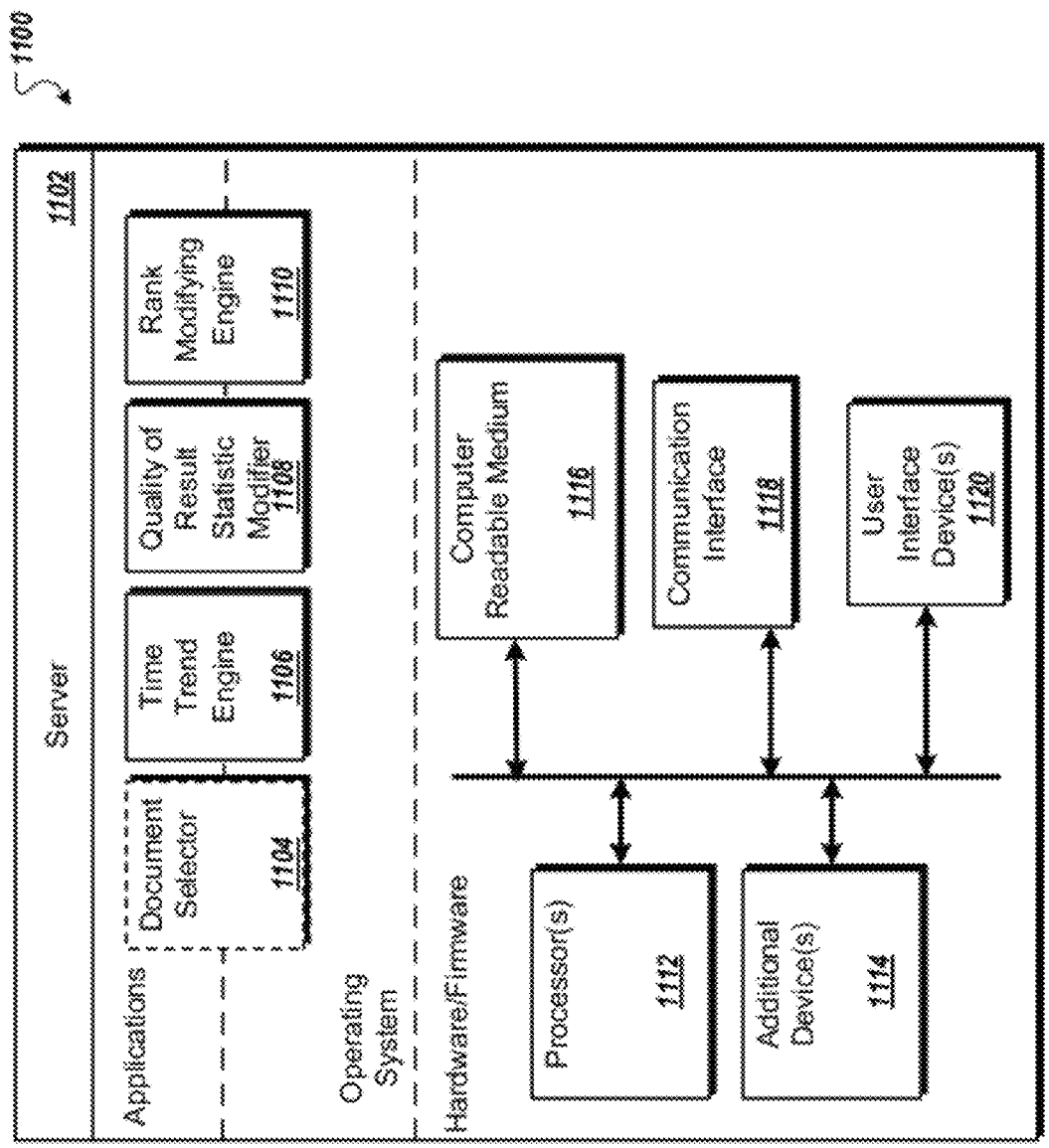
FIG. 11 illustrates an example architecture of a system.

FIG. 11 illustrates an example architecture of a system 1100. The system generally consists of a server 1102. The server is optionally connected to one or more user computers through a network.

The server 1102 consists of one or more data processing apparatus. While only one data processing apparatus is shown in FIG. 11, multiple data processing apparatus can be used. The server includes various modules, e.g. executable software programs, including an optional document selector 1104, a time trend engine 1106, a quality of result statistic modifier 1108, and a ranking engine 1110. Each module runs as part of the operating system on the server, runs as an application on the server, or runs as part of the operating system and part of an application on the server.

The optional document selector 1104 selects one or more documents to use in calculating the difference score, for example, as described above with reference to FIG. 9. The time trend engine 1106 calculates time trends for quality of result statistics for a document in response to a query or differences between quality of result statistics for a group of documents responsive to the query, for example, as described above with reference to FIGS. 7-10. The quality of result statistic modifier 1108 modifies quality of result statistics for queries and documents based at least in part on the time trends or differences, for example, as described above with reference to FIGS. 7-10. The rank modifier engine 1110 provides signals to a ranking engine used to rank documents responsive to a query, for example, as described above with reference to FIG. 3.

The server 1102 can also have hardware or firmware devices including one or more processors 1112, one or more additional devices 1114, computer readable medium 1116, a communication interface 1118, and one or more user interface devices 1120. Each processor 1108 is capable of processing instructions for execution within the server 1102. In some implementations, the processor 1108 is a single-threaded processor. In other implementations, the processor 1108 is a multi-threaded processor. Each processor 1108 is capable of processing instructions stored on the computer readable medium 1116 or on a storage device such as one of the additional devices 1114. The server 1102 uses its communication interface 1118 to communicate with one or more computers, for example, over a network. Examples of user interface devices 1120 include a display, a camera, a speaker, a microphone, a tactile feedback device, a keyboard, and a mouse.

The server 1102 can store instructions that implement operations associated with the modules described above, for example, on the computer readable medium 1116 or one or more additional devices 1114, for example, one or more of a floppy disk device, a hard disk device, an optical disk device, or a tape device. In some implementations, the server 1102 also stores additional data, for example, quality of result statistics and modified quality of result statistics, on the computer readable medium 116 or one or more additional devices 1114.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   calculating one or more time trend statistics for a plurality of quality of result statistics for a first document as a search result for a first query, each of the quality of result statistics corresponding to a different time period, the one or more time trend statistics estimating changes in the quality of result statistics over time, wherein each of the one or more time trend statistics comprises a quality of result difference between a first quality of result statistic for the first document as a search result for the first query during a first time period and a second quality of result statistic for the first document as a search result for the first query during a second time period;
   generating a first modified quality of result statistic by modifying a first quality of result statistic for the first document as a search result for the first query by a factor, where the factor is based on the one or more time trend statistics; and
   providing the first modified quality of result statistic as an input to a document ranking process for the first document and the first query.

2. The method of claim 1, further comprising verifying that the quality of result difference satisfies a statistically significant threshold before generating the first modified quality of result statistic.

3. The method of claim 2, wherein the factor is further based on how statistically significant the quality of result difference is.

4. The method of claim 1, further comprising:
generating a second modified quality of result statistic for the first document and a second different query according to the one or more time trend statistics; and
providing the second modified quality of result statistic as an input to the document ranking process for the first document and the second query.

5. The method of claim 1, further comprising determining that a first past version of the first document during the first time period is different from a second past version of the first document during the second time period before modifying the first quality of result statistic.

6. The method of claim 5, wherein determining that the first past version of the first document is different from the second past version of the first document comprises calculating a similarity score that is a measure of similarities between shingles extracted from the first past version of the first document and shingles extracted from the second past version of the first document, and determining that the similarity score satisfies a threshold.

7. The method of claim 1, further comprising:
identifying a third query as related to the first document based on a quality of result statistic for the third query and the first document;
generating a third modified quality of result statistic for the third query and a second document by modifying a quality of result statistic for the third query and the second document by a factor, where the factor is based on the one or more time trend statistics; and
providing the third modified quality of result statistic as an input to the document ranking process for the second document and the third query.

8. The method of claim 1, wherein each quality of result statistic is an estimate of a respective percentage of users that found the first document relevant to the first query out of a first total number of users who viewed the first document as a search result for the first query during a respective time period.

9. A computer-implemented method comprising:
calculating a difference score for first quality of result statistics for a group of documents as search results for a first query corresponding to a first time period and second quality of result statistics for the group of documents as search results for the first query corresponding to a different second time period, wherein a quality of result statistic for a particular document in the group of documents and for a particular time period is an estimate of a respective portion of user interactions with the particular document as a search result for the first query during the particular time period out of a total number of user interactions with documents as search results for the first query during the particular time period;
identifying one or more documents that are responsive to the first query and modifying a respective quality of result statistic for each identified document based on the difference score, resulting in a respective modified quality of result statistic for each identified document; and
providing the respective modified quality of result statistic for one of the identified documents as an input to the document ranking process for the identified documents and the first query.

10. A system comprising:
one or more computers, programmed to perform operations comprising:
calculating one or more time trend statistics for a plurality of quality of result statistics for a first document as a search result for a first query, each of the quality of result statistics corresponding to a different time period, the one or more time trend statistics estimating changes in the quality of result statistics over time, wherein each of the one or more time trend statistics include a quality of result difference between a first quality of result statistic for a first document as a search result for a first query during a first time period and a second quality of result statistic for the first document as a search result the first query during a second time period;
generating a first modified quality of result statistic by modifying a first quality of result statistic for the first document as a search result for the first query by a factor, where the factor is based on the one or more time trend statistics; and
providing the first modified quality of result statistic as an input to a document ranking process for the first document and the first query.

11. The system of claim 10, further programmed to perform operations comprising verifying that the quality of result difference satisfies a statistically significant threshold before generating the first modified quality of result statistic.

12. The system of claim 11, wherein the factor is further based on how statistically significant the quality of result difference is.

13. The system of claim 10, further programmed to perform operations comprising:
generating a second modified quality of result statistic for the first document and a second different query according to the one or more time trend statistics; and
providing the second modified quality of result statistic as an input to the document ranking process for the first document and the second query.

14. The system of claim 10, further programmed to perform operations comprising determining that a first past version of the first document during the first time period is different from a second past version of the first document during the second time period before modifying the first quality of result statistic.

15. The system of claim 14, wherein determining that the first past version of the first document is different from the second past version of the first document comprises calculating a similarity score that is a measure of similarities between shingles extracted from the first past version of the first document and shingles extracted from the second past version of the first document, and determining that the similarity score satisfies a threshold.

16. The system of claim 10, further programmed to perform operations comprising:
identifying a third query as related to the first document based on a quality of result statistic for the third query and the first document;
generating a third modified quality of result statistic for the third query and a second document by modifying a quality of result statistic for the third query and the second document by a factor, where the factor is based on the one or more time trend statistics; and
providing the third modified quality of result statistic as an input to the document ranking process for the second document and the third query.

17. The system of claim 10, wherein each quality of result statistic is an estimate of a respective percentage of users that found the first document relevant to the first query out of a first total number of users who viewed the first document as a search result for the first query during a respective time period.

18. A system comprising:
one or more computers programmed to perform operations comprising:
calculating a difference score for first quality of result statistics for a group of documents as search results for a first query corresponding to a first time period and second quality of result statistics for the group of documents as search results for the first query corresponding to a different second time period, wherein a quality of result statistic for a particular document in the group of documents and for a particular time period is an estimate of a respective portion of user interactions with the particular document as a search result for the first query during the particular time period out of a total number of user interactions with documents as search results for the first query during the particular time period;
identifying one or more documents that are responsive to the first query and modifying a respective quality of result statistic for each identified document based on the difference score, resulting in a respective modified quality of result statistic for each identified document; and
providing the respective modified quality of result statistic for one of the identified documents as an input to the document ranking process for the identified documents and the first query.

19. A storage device having instructions stored thereon that, when executed by data processing apparatus, cause the data processing apparatus to perform actions comprising:
calculating one or more time trend statistics for a plurality of quality of result statistics for a first document as a search result for a first query, each of the quality of result statistics corresponding to a different time period, the one or more time trend statistics estimating changes in the quality of result statistics over time, wherein each of the one or more time trend statistics comprises a quality of result difference between a first quality of result statistic for the first document as a search result for the first query during a first time period and a second quality of result statistic for the first document as a search result for the first query during a second time period;
generating a first modified quality of result statistic by modifying a first quality of result statistic for the first document as a search result for the first query by a factor, where the factor is based on the one or more time trend statistics; and
providing the first modified quality of result statistic as an input to a document ranking process for the first document and the first query.

20. The storage device of claim 19 wherein the operations further comprise verifying that the quality of result difference satisfies a statistically significant threshold before generating the first modified quality of result statistic.

21. The storage device of claim 20 wherein the factor is further based on how statistically significant the quality of result difference is.

22. The storage device of claim 19 wherein the operations further comprise:
generating a second modified quality of result statistic for the first document and a second different query according to the one or more time trend statistics; and
providing the second modified quality of result statistic as an input to the document ranking process for the first document and the second query.

23. The storage device of claim 19 wherein the operations further comprise determining that a first past version of the first document during the first time period is different from a second past version of the first document during the second time period before modifying the first quality of result statistic.

24. The storage device of claim 23 wherein determining that the first past version of the first document is different from the second past version of the first document comprises calculating a similarity score that is a measure of similarities between shingles extracted from the first past version of the first document and shingles extracted from the second past version of the first document, and determining that the similarity score satisfies a threshold.

25. The storage device of claim 19 wherein the operations further comprise:
identifying a third query as related to the first document based on a quality of result statistic for the third query and the first document;
generating a third modified quality of result statistic for the third query and a second document by modifying a quality of result statistic for the third query and the second document by a factor, where the factor is based on the one or more time trend statistics; and
providing the third modified quality of result statistic as an input to the document ranking process for the second document and the third query.

26. The storage device of claim 19 wherein each quality of result statistic is an estimate of a respective percentage of users that found the first document relevant to the first query out of a first total number of users who viewed the first document as a search result for the first query during a respective time period.

27. A storage device having instructions stored thereon that, when executed by data processing apparatus, cause the data processing apparatus to perform actions comprising:
calculating a difference score for first quality of result statistics for a group of documents as search results for a first query corresponding to a first time period and second quality of result statistics for the group of documents as search results for the first query corresponding to a different second time period, wherein a quality of result statistic for a particular document in the group of documents and a particular time period is an estimate of a respective portion of user interactions with the particular document as a search result for the first query during the particular time period out of a total number of user interactions with documents as search results for the first query during the particular time period;
identifying one or more documents that are responsive to the first query and modifying a respective quality of result statistic for each identified document based on the difference score, resulting in a respective modified quality of result statistic for each identified document; and
providing the respective modified quality of result statistic for one of the identified documents as an input to the document ranking process for the identified documents and the first query.

28. A computer-implemented method comprising:
calculating one or more time trend statistics for a plurality of quality of result statistics for a first document as a search result for a first query, each of the quality of result statistics corresponding to a different time period and being an estimate of a respective portion of users that found the first document relevant to the first query out of a total number of users who viewed the first document as a search result for the first query during the time period, the one or more time trend statistics estimating changes in the quality of result statistics over time;

generating a first modified quality of result statistic by modifying a first quality of result statistic for the first document as a search result for the first query by a factor, where the factor is based on the one or more time trend statistics; and providing the first modified quality of result statistic as an input to a document ranking process for the first document and the first query.

29. The method of claim 28, wherein the one or more time trend statistics include a quality of result difference between two of the quality of result statistics.

30. The method of claim 29, further comprising verifying that the quality of result difference satisfies a statistically significant threshold before generating the first modified quality of result statistic.

31. The method of claim 30, wherein the factor is further based on how statistically significant the quality of result difference is.

32. The method of claim 28, further comprising:
generating a second modified quality of result statistic for the first document and a second different query according to the one or more time trend statistics; and
providing the second modified quality of result statistic as an input to the document ranking process for the first document and the second query.

33. The method of claim 28, further comprising determining that a first past version of the first document during a first time period is different from a second past version of the first document during a second time period before modifying the first quality of result statistic.

34. The method of claim 33, wherein determining that the first past version of the first document is different from the second past version of the first document comprises calculating a similarity score that is a measure of similarities between shingles extracted from the first past version of the first document and shingles extracted from the second past version of the first document, and determining that the similarity score satisfies a threshold.

35. The method of claim 28, further comprising:
identifying a second query as related to the first document based on a quality of result statistic for the second query and the first document;
generating a second modified quality of result statistic for the second query and a second document by modifying a quality of result statistic for the second query and the second document by a factor, where the factor is based on the one or more time trend statistics; and
providing the second modified quality of result statistic as an input to the document ranking process for the second document and the second query.

36. A system comprising:
one or more computers programmed to perform operations comprising:
calculating one or more time trend statistics for a plurality of quality of result statistics for a first document as a search result for a first query, each of the quality of result statistics corresponding to a different time period and being an estimate of a respective portion of users that found the first document relevant to the first query out of a total number of users who viewed the first document as a search result for the first query during the time period, the one or more time trend statistics estimating changes in the quality of result statistics over time;
generating a first modified quality of result statistic by modifying a first quality of result statistic for the first document as a search result for the first query by a factor, where the factor is based on the one or more time trend statistics; and
providing the first modified quality of result statistic as an input to a document ranking process for the first document and the first query.

37. The system of claim 36, wherein the one or more time trend statistics include a quality of result difference between two of the quality of result statistics.

38. The system of claim 37, further programmed to perform operations comprising verifying that the quality of result difference satisfies a statistically significant threshold before generating the first modified quality of result statistic.

39. The system of claim 36, wherein the factor is further based on how statistically significant the quality of result difference is.

40. The system of claim 36, further programmed to perform operations comprising:
generating a second modified quality of result statistic for the first document and a second different query according to the one or more time trend statistics; and
providing the second modified quality of result statistic as an input to the document ranking process for the first document and the second query.

41. The system of claim 36, further programmed to perform operations comprising determining that a first past version of the first document during a first time period is different from a second past version of the first document during a second time period before modifying the first quality of result statistic.

42. The system of claim 41, wherein determining that the first past version of the first document is different from the second past version of the first document comprises calculating a similarity score that is a measure of similarities between shingles extracted from the first past version of the first document and shingles extracted from the second past version of the first document, and determining that the similarity score satisfies a threshold.

43. The system of claim 36, further programmed to perform operations comprising:
identifying a second query as related to the first document based on a quality of result statistic for the second query and the first document;
generating a second modified quality of result statistic for the second query and a second document by modifying a quality of result statistic for the second query and the second document by a factor, where the factor is based on the one or more time trend statistics; and
providing the second modified quality of result statistic as an input to the document ranking process for the second document and the second query.

44. A computer storage device having instructions stored thereon that, when executed by data processing apparatus, cause the data processing apparatus to perform operations comprising:
calculating one or more time trend statistics for a plurality of quality of result statistics for a first document as a search result for a first query, each of the quality of result statistics corresponding to a different time period and being an estimate of a respective portion of users that found the first document relevant to the first query out of a total number of users who viewed the first document as a search result for the first query during the time period, the one or more time trend statistics estimating changes in the quality of result statistics over time;
generating a first modified quality of result statistic by modifying a first quality of result statistic for the first document as a search result for the first query by a factor, where the factor is based on the one or more time trend statistics; and providing the first modified quality of result statistic as an input to a document ranking process for the first document and the first query.

45. The storage device of claim 44, wherein the one or more time trend statistics include a quality of result difference between two of the quality of result statistics.

46. The storage device of claim 44 wherein the operations further comprise verifying that the quality of result difference satisfies a statistically significant threshold before generating the first modified quality of result statistic.

47. The storage device of claim 46 wherein the factor is further based on how statistically significant the quality of result difference is.

48. The storage device of claim 44 wherein the operations further comprise:

generating a second modified quality of result statistic for the first document and a second different query according to the one or more time trend statistics; and providing the second modified quality of result statistic as an input to the document ranking process for the first document and the second query.

49. The storage device of claim 44 wherein the operations further comprise determining that a first past version of the first document during a first time period is different from a second past version of the first document during a second time period before modifying the first quality of result statistic.

50. The storage device of claim 49 wherein determining that the first past version of the first document is different from the second past version of the first document comprises calculating a similarity score that is a measure of similarities between shingles extracted from the first past version of the first document and shingles extracted from the second past version of the first document, and determining that the similarity score satisfies a threshold.

51. The storage device of claim 44 wherein the operations further comprise:

identifying a second query as related to the first document based on a quality of result statistic for the second query and the first document;

generating a second modified quality of result statistic for the second query and a second document by modifying a quality of result statistic for the second query and the second document by a factor, where the factor is based on the one or more time trend statistics; and providing the second modified quality of result statistic as an input to the document ranking process for the second document and the second query.

\* \* \* \* \*

UNITED STATES PATENT AND TRADEMARK OFFICE
CERTIFICATE OF CORRECTION

| | | |
|---|---|---|
| PATENT NO. | : 8,874,555 B1 | Page 1 of 1 |
| APPLICATION NO. | : 12/623276 | |
| DATED | : October 28, 2014 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 671 days.

Signed and Sealed this
Twentieth Day of October, 2015

Michelle K. Lee
*Director of the United States Patent and Trademark Office*